(12) United States Patent
Venkataraman et al.

(10) Patent No.: US 12,124,564 B2
(45) Date of Patent: Oct. 22, 2024

(54) SECURE MODULAR MACHINE LEARNING PLATFORM

(71) Applicant: Oracle International Corporation, Redwood Shores, CA (US)

(72) Inventors: Madalasa Venkataraman, Bangalore (IN); Paul Deepakraj Retinraj, Fremont, CA (US); Pradeep Sanchana, Srikakulam (IN); Rohit Sukumaran, Bangalore (IN); Oleksandr Khimich, Kyle, TX (US)

(73) Assignee: Oracle International Corporation, Redwood Shores, CA (US)

( * ) Notice: Subject to any disclaimer, the term of this patent is extended or adjusted under 35 U.S.C. 154(b) by 277 days.

(21) Appl. No.: 17/870,403

(22) Filed: Jul. 21, 2022

(65) Prior Publication Data
US 2023/0334145 A1 Oct. 19, 2023

Related U.S. Application Data

(60) Provisional application No. 63/330,645, filed on Apr. 13, 2022.

(51) Int. Cl.
*G06F 21/53* (2013.01)
*G06F 21/56* (2013.01)

(52) U.S. Cl.
CPC ............... *G06F 21/53* (2013.01); *G06F 21/56* (2013.01); *G06F 2221/03* (2013.01)

(58) Field of Classification Search
CPC ....... G06F 21/56; G06F 21/53; G06F 2221/03
USPC ..................................................... 726/22–25
See application file for complete search history.

(56) References Cited

U.S. PATENT DOCUMENTS

| | | | | |
|---|---|---|---|---|
| 8,356,351 B2* | 1/2013 | Fu | ........................ | G06F 9/44589 |
| | | | | 718/1 |
| 8,850,574 B1* | 9/2014 | Ansel | ...................... | G06F 21/53 |
| | | | | 717/148 |
| 10,162,617 B2* | 12/2018 | Eltsin | ................... | G06F 9/45516 |
| 11,470,053 B2* | 10/2022 | Karame | ................... | G06N 3/04 |
| 11,675,648 B2* | 6/2023 | Chen | ................... | G06F 11/0754 |
| | | | | 714/38.1 |
| 2020/0234184 A1* | 7/2020 | Kesarwani | ........ | G06F 16/90335 |
| 2020/0372307 A1* | 11/2020 | Arun | ................... | G06F 18/2178 |
| 2021/0397999 A1* | 12/2021 | Bernat | ............... | G06F 15/7867 |

(Continued)

*Primary Examiner* — Amare F Tabor
(74) *Attorney, Agent, or Firm* — Invoke

(57) ABSTRACT

A secure, modular multi-tenant machine learning platform is configured to: receive untrusted code supplied by a first tenant; perform a security scan of the untrusted code to determine whether the untrusted code satisfies a set of one or more security requirements; responsive to determining that the untrusted code satisfies the security requirement(s): deploy the untrusted code to a runtime execution environment; deploy a machine learning model associated with the first tenant to the runtime execution environment, the untrusted code being configured to perform one or more functions using the machine learning model; receive a set of untrusted code supplied by a second tenant; perform a security scan of the untrusted code to determine whether the untrusted code satisfies the security requirement(s); and responsive to determining that the untrusted code does not satisfy the security requirement(s): refraining from deploying the untrusted code to a runtime execution environment.

20 Claims, 28 Drawing Sheets

(56) References Cited

U.S. PATENT DOCUMENTS

| | | | |
|---|---|---|---|
| 2022/0391199 A1* | 12/2022 | Ashrafzadeh | G06F 8/71 |
| 2022/0391239 A1* | 12/2022 | Feldman | G06N 20/00 |
| 2023/0153447 A1* | 5/2023 | Kapadia | G06F 21/604 |
| | | | 726/26 |

* cited by examiner

< Create Algorithm

806

① Details — ② Code — ③ Attributes — ④ Configuration

Name*
test

Description
height estimator

Family
Custom Algo Family ▽

Required ← 814

Purpose
Scoring ▽

FIG. 8D

← test

Details Code Attributes Configuration

Import a docker image
The code for the algorithm will be picked from the docker image.

Docker Image URL — 818
[Enter url of the OCIR or public registry]
Required

Username — 820
Required

Password — 822
Required

Attach a JSON file (Required)
When this algorithm is used in a model, this JSON file will be loaded during scoring.

Drag and Drop
Select a file or drop one here.
+ — 824

Save

◁ test

Inputs
Enter the list of attributes that are expected by the algorithm in the input data during training/scoring.

| Attribute name | Data type ▽ | | Description | + |
|---|---|---|---|---|
| | Required | | Required | |
| Attribute name ⇅ | Data type ⇅ | | Description ⇅ | |

No data to display.

Outputs
Enter the list of attributes that will be output by the algorithm after scoring is invoked.

| Attribute name | Data type ▽ | Key attribute ▽ | Description | + |
|---|---|---|---|---|
| | Required | Required | | |
| Attribute name ⇅ | Data type ⇅ | Key attribute ⇅ | Description ⇅ | |

No data to display.

Save

« test

Inputs
Enter the list of attributes that are expected by the algorithm in the input data during training/scoring

| Attribute name | Data type | Description |
|---|---|---|
| | Integer ▽ | age |
| Required | Required | |
| Attribute name ⇅ | Data type ⇅ | Description ⇅ |
| weight | INT | weight |

Outputs
Enter the list of attributes that will be output by the algorithm after scoring is invoked.

| Attribute name | Data type | Key attribute | Description |
|---|---|---|---|
| height| | | Key attribute ▽ | Description |
| Required | Required | Required | |
| Attribute name ⇅ | Data type ⇅ | Key attribute ⇅ | Description ⇅ |

No data to display.

Save

FIG. 8G

Intelligence workbench
Analyze data and predict outcomes using machine learning

| Algorithms | Models — 846 | | | | Publish |
|---|---|---|---|---|---|
| | | | | | Create model |
| Status ⇅ | Name ⇅ | Training schedule ⇅ | Scoring schedule ⇅ | Last modified ↓ | Actions |
| Available | attrrcp2 | On demand | On demand | 18 Feb 2022, | ••• |
| Available | cltvrcp2 | On demand | On demand | 18 Feb 2022, | ••• |
| Available | nbarcp2 | On demand | On demand | 18 Feb 2022, | ••• |
| Available | nborcp2 | On demand | On demand | 18 Feb 2022, | ••• |
| Available | fatigue-test fatigue-test | On demand | On demand | 17 Feb 2022, | ••• |

‹ Create Model

Inputs ← 870
Mapping between the input attributes of the algorithm and query attributes.

| Algorithm input attributes | Data type | Description |
|---|---|---|
| Campaign_id | INT | Campaign ID |
| Order date | TIMESTAMP | Order date |

872

Outputs
Mapping between the output attributes of the algorithm and Unity attributes.

| Algorithm output attributes | Description | Data type | Is key attribute | Unity object id | Column id | Action |
|---|---|---|---|---|---|---|
| Attribution percentage | Per | FLOAT | true | | Attribution percentage | |
| Campaign ID | ID | INT | true | | Campaign ID | |

Save

FIG. 8N

SECURE MODULAR MACHINE LEARNING PLATFORM

INCORPORATION BY REFERENCE; DISCLAIMER

The following application is hereby incorporated by reference: U.S. Provisional Patent Application 63/330,645, filed Apr. 13, 2022. The applicant hereby rescinds any disclaimer of claims scope in the parent application(s) or the prosecution history thereof and advise the USPTO that the claims in the application may be broader that any claim in the parent application(s)

TECHNICAL FIELD

The present disclosure relates to machine learning. In particular, the present disclosure relates to software-as-a-service (SaaS) machine learning platforms.

BACKGROUND

Entities (e.g., businesses, organizations, individuals, etc.) are increasingly turning to machine learning to solve complex problems. Many of these entities have invested heavily (in time, money, and computing resources, for example) in creating customized data science models that solve use cases and implement business logic that is of particular interest to those entities. Such bespoke approaches may be necessary because commercially available solutions generally do not provide the desired entity-specific functionality.

For example, even if a commercially available SaaS data model has access to all the relevant data, an entity-specific model may require exporting raw data and reingesting processed machine learning model scores. The process of exporting and reingesting the entity's unique intellectual property introduces concerns about security, data access control, data staleness, etc. that must be addressed by the external system(s) (e.g., a data lake) through which the model is fed.

In some cases, an entity's custom-built machine learning model produces output that can serve as input to a SaaS product. For example, an entity may develop a customized churn model that accounts for its subscription business' unique data patterns. A third-party integration tool may allow a downstream SaaS product to consume and process the churn model's decision outcomes (e.g., decisions about customers' propensity to churn).

In addition, an entity may require or prefer to use a machine learning system that is not shared with other entities. For example, a business may prefer to keep a machine learning system separate from other businesses, in order to protect trade secrets and/or other sensitive information (e.g., employee data, earnings data, etc.). A typical approach is for the entity to host a machine learning system in its own network. However, a machine learning system may require training data and/or production data that is hosted in another location, such as a cloud storage service. The data storage location may be physically and/or logically remote (e.g., requiring data to traverse many network nodes) from the machine learning system.

The physical and/or logical distance between the data and the machine learning system can introduce various performance and/or security concerns. As one example, the physical and/or logical distance between the data and the machine learning system can introduce significant latency in transmitting data to and from the machine learning system, thus reducing overall machine learning performance. As another example, transmitting sensitive data over untrusted nodes in a public network may increase the risk that the data is intercepted by a malicious actor or otherwise compromised. As another example, if a network path between the machine learning system and the data storage goes down, the machine learning system may become inoperable due to lack of access to the data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings.

DETAILED DESCRIPTION

Figure 1A:
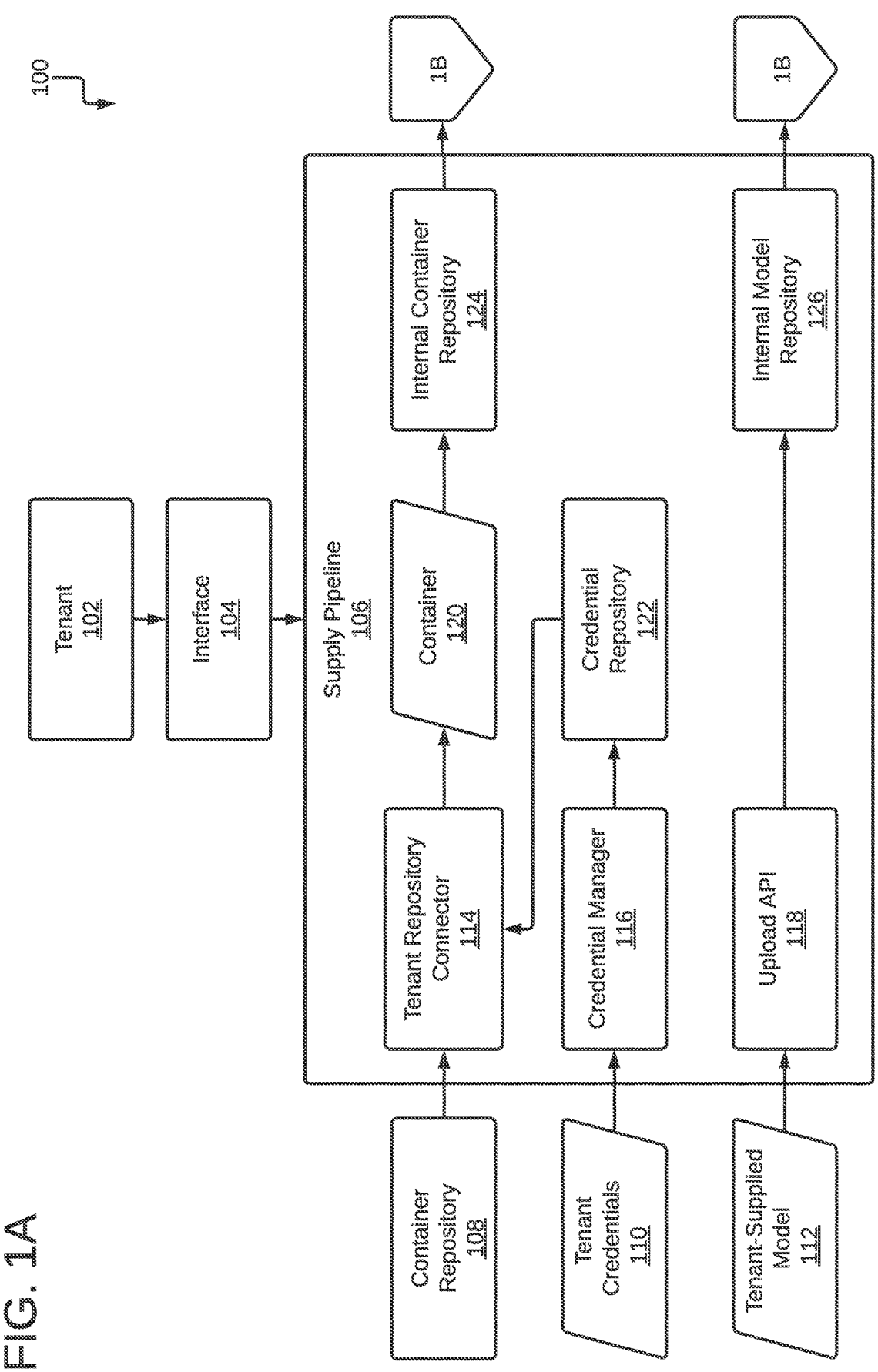
FIGS. 1A-1E show block diagrams that illustrate an example of a secure modular machine learning platform in accordance with one or more embodiments.
Figure 1B:
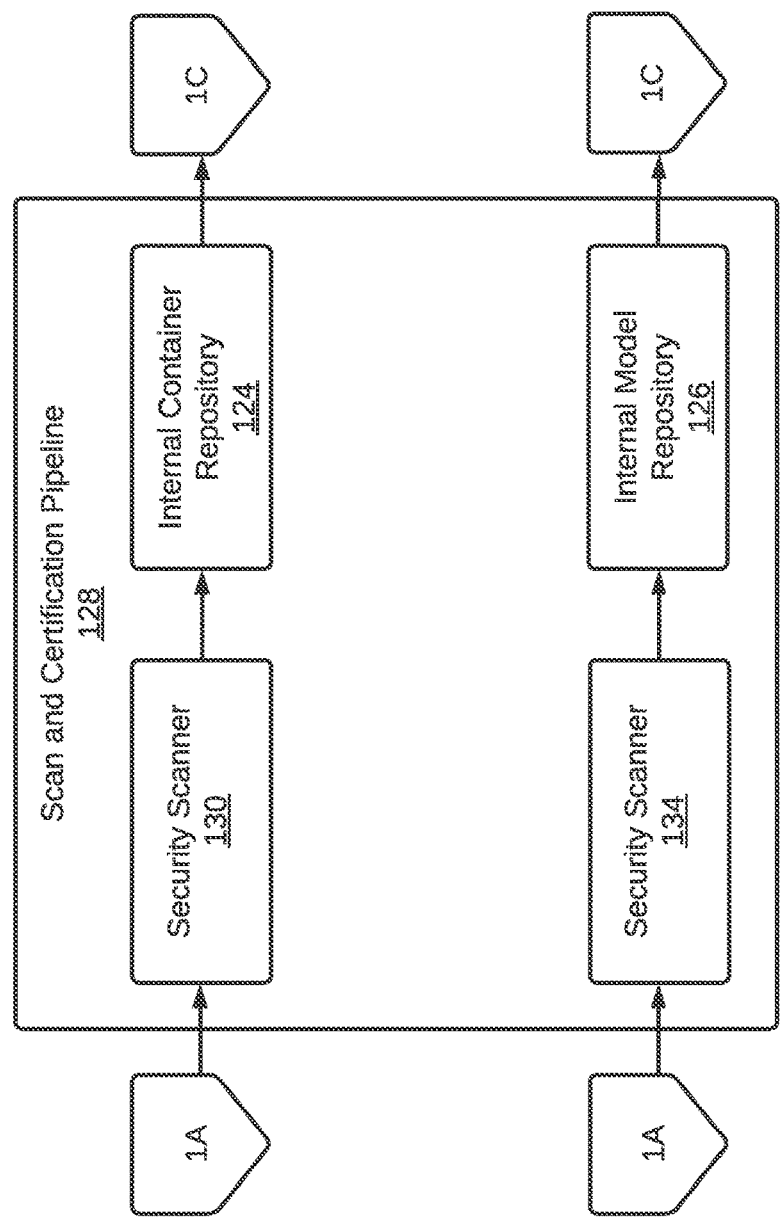
Figure 1C:
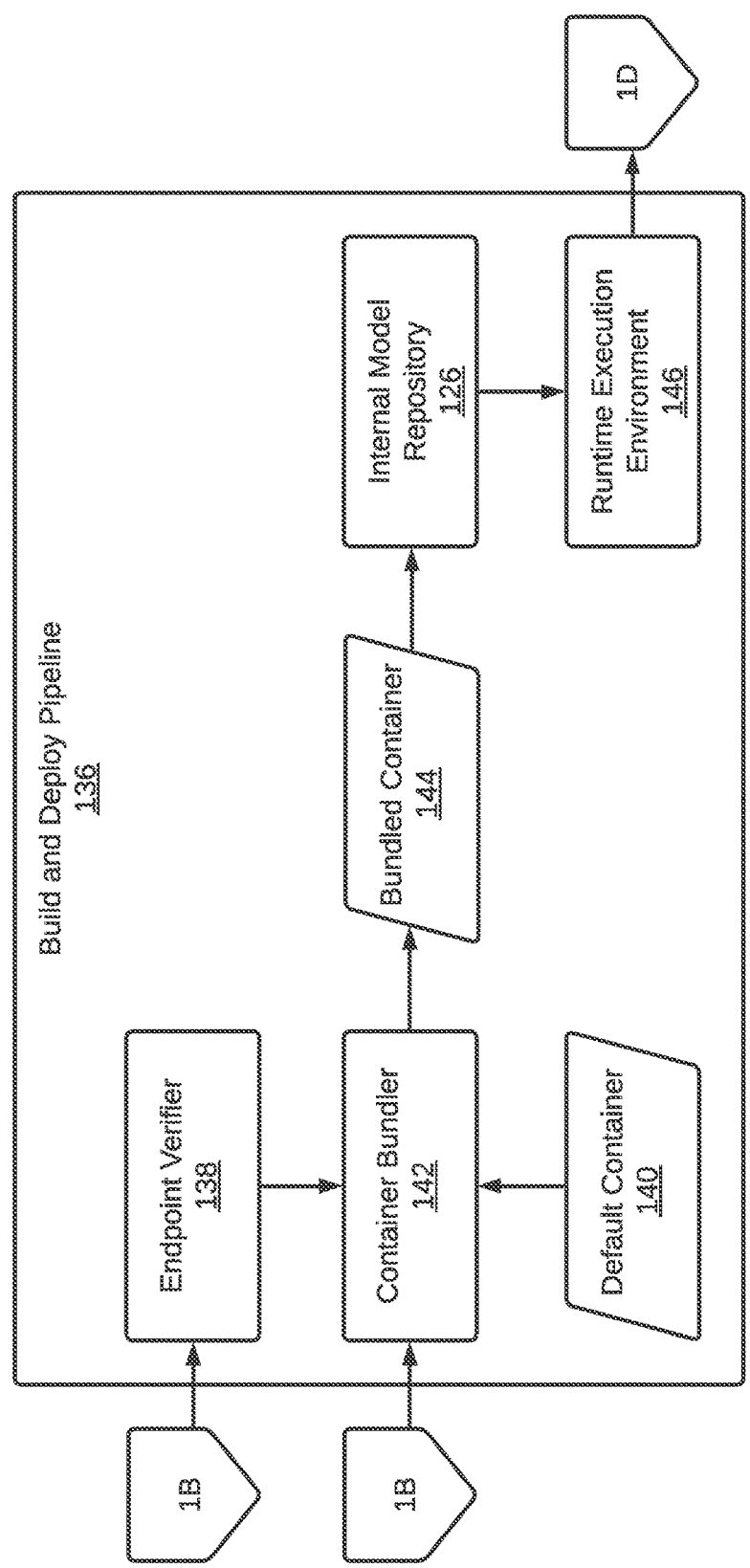
Figure 1D:
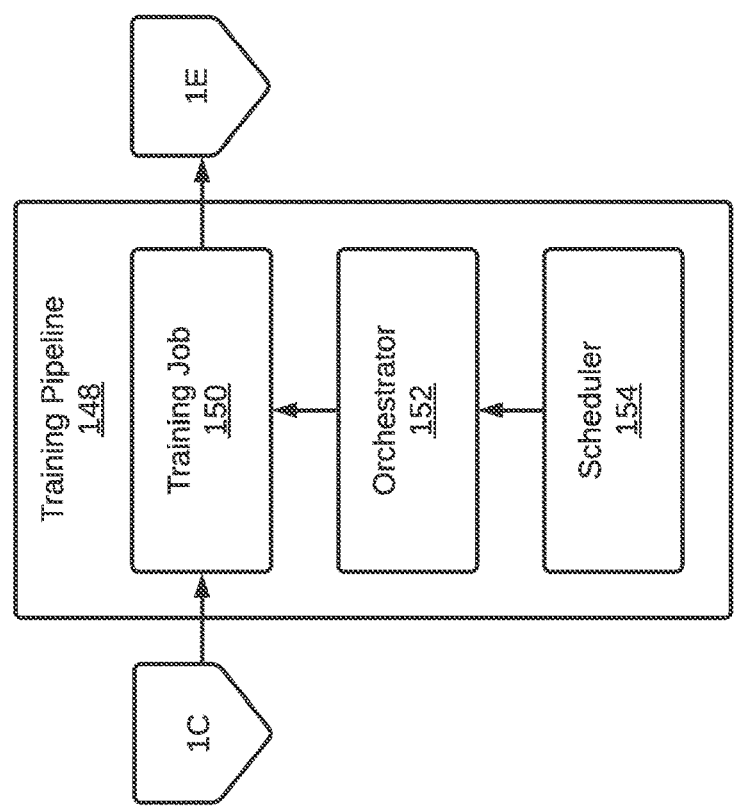
Figure 1E:
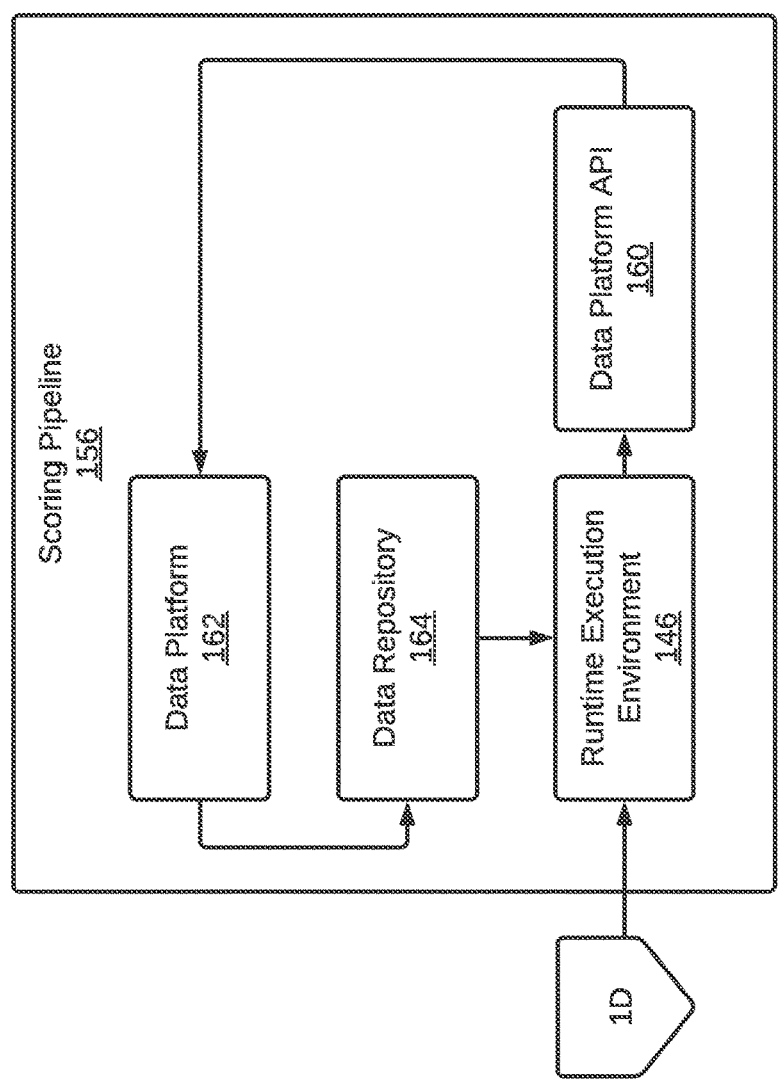

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments.

1. GENERAL OVERVIEW
2. EXAMPLE SYSTEM
   2.1. PIPELINE ARCHITECTURE
      2.1.1. CONTAINER SUPPLY
      2.1.1. MODEL SUPPLY 2.1.2. SCAN AND CERTIFICATION PIPELINE
2.1.3. BUILD AND DEPLOY PIPELINE
2.1.4. TRAINING PIPELINE
2.1.5. SCORING PIPELINE
2.2. NETWORK ISOLATION
2.3. DATA STORAGE
2.4. USER INTERFACE
2.5. TENANTS
2.6. MACHINE LEARNING
3. MACHINE LEARNING
4. MACHINE LEARNING MODEL/PROFILE CONFIGURATION
5. TENANT ISOLATION
6. DEPLOYING UNTRUSTED CODE
7. TRAINING A MACHINE LEARNING MODEL
8. APPLYING A MACHINE LEARNING MODEL
9. EXAMPLE GRAPHICAL USER INTERFACES
10. COMPUTER NETWORKS AND CLOUD NETWORKS
11. MICROSERVICE APPLICATIONS
    11.1. TRIGGERS
    11.2. ACTIONS
12. HARDWARE OVERVIEW
13. MISCELLANEOUS; EXTENSIONS

1. General Overview

In one or more embodiments, a machine learning platform is a software-as-a-service (SaaS) platform configured to host machine learning systems for multiple tenants. The machine learning platform is modular in that it allows each tenant to supply its own machine learning model(s) and/or code that uses the machine learning model(s). The machine learning platform is secure in at least two senses: first, in that it analyzes tenant-supplied models and/or other untrusted code for vulnerabilities before deployment to a runtime execution environment hosted by the platform; and second, in that it hosts each tenant's machine learning system(s) in a location that is physically and/or logically isolated from other tenants (e.g., in separate runtime execution environments and/or physical machines), thus protecting each tenant's data, while keeping the physical and/or logical distance between the data and the machine learning systems comparatively low (e.g., as compared with entity-hosted solutions). One or more embodiments described herein may be referred to as a "bring-your-own-model" (BYOM) and/or "bring-your-own-inference" (BYOI) approach.

One or more embodiments are configured to consume an entity's model as a secure service deployed in a scalable, secure, isolated architecture—thereby providing a technical improvement over systems that attempt to use third-party integrations between bespoke models and the data source(s) used by those models. Reducing the physical and/or logical distance between the model and the data allows data to be processed (e.g., scored) in a near-real-time pipeline using each entity's respective customized, purpose-built machine learning models. This approach helps ensure that data is no longer stale, so that large data pipelines do not need to be maintained and hydrated. An entity's machine learning model can be accessed directly, helping to provide a return on the entity's investment in data science. Moreover, one or more embodiments provide cost savings by reducing costs associated with data transfer and latency.

A SaaS product according to one or more embodiments provides extensible machine learning framework, in which each entity's machine learning models are consumed, orchestrated through flexible data and model pipelines, and deployed in a scalable and extensible architecture that integrates tightly and seamlessly into the SaaS product. An entity's machine learning models may be deployed in an isolated network that protects itself from potentially malicious zero-trust code by identifying and neutralizing threats in the entity's code, thus protecting both the orchestrator deployments and other entities' respective models.

One or more embodiments described in this Specification and/or recited in the claims may not be included in this General Overview section.

2. Example System

FIGS. 1A-1E illustrates an example of a secure modular machine learning platform 100 in accordance with one or more embodiments. As illustrated in FIG. 1A-1E, the platform 100 includes: a supply pipeline 106 and various components thereof; a scan and certification pipeline 128 and various components thereof; a build and deploy pipeline 136 and various components thereof; a training pipeline 148 and various components thereof; and a scoring pipeline 156 and various components thereof. In one or more embodiments, the platform 100 may include more or fewer components than the components illustrated in FIGS. 1A-1E. The components illustrated in FIGS. 1A-1E may be local to or remote from each other. The components illustrated in FIGS. 1A-1E may be implemented in software and/or hardware. Each component may be distributed over multiple applications and/or machines. Multiple components may be combined into one application and/or machine. Operations described with respect to one component may instead be performed by another component.

For ease of discussion, examples are described herein with reference to components produced by one or more specific vendors. For example, some examples include one or more components produced by Oracle International Corporation, one or more components produced by Docker Inc., etc. One or more embodiments are not limited to the specific components produced by the specific vendors used in these examples.

Additional embodiments and/or examples relating to computer networks are described below in the section titled "Computer Networks and Cloud Networks."

In one or more embodiments, one or more components of the platform 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.1. Pipeline Architecture

As noted above, the platform 100 includes one or more of: a supply pipeline 106; a scan and certification pipeline 128; a build and deploy pipeline 136; a training pipeline 148; and/or a scoring pipeline 156. Examples of each of these pipelines are described in further detail below. One or more of the pipelines (e.g., supply pipeline 106 and scan and certification pipeline 128) may be implemented within a tenant's isolated network within the platform 100, i.e., a physical and/or virtual network in the platform 100 that is isolated from similar networks used by other tenants. Machine learning activities such as training, scoring, etc. may be activated through the respective pipelines. The platform 100 may be configured to ingest data into the training pipeline from a previous and/or ongoing export into tenant-specific storage (e.g., a tenant-specific object store). For example, the platform may host tenant-specific storage within a tenant-specific compartment that provides physical and/or logical isolation from other tenants.

In examples described herein, untrusted code is provided in container images, such as Docker images and/or other kinds of container images. Alternatively or additionally, untrusted code may be provided in another format that is suitable for deployment to a runtime execution environment. In general, container images can execute in any environment that supports the corresponding container image format; thus, container images can be prepared tenant-side and deployed to the platform 100 even if the two systems use different operating systems, etc.

In an embodiment, container images and model files follow separate pipelines, or separate paths through the same pipelines; this allows for a tenant to replace an image without needing to resupply the model file, or to replace a model file without resupplying the image.

2.1.1. Container Supply

In an embodiment, the supply pipeline 106 is configured to ingest a container 120 that includes untrusted code. As used herein, a "container" refers to a packaged set of code that can be executed in any environment that supports the container format. A container 120 may also be referred to as an "image" or "container image." Examples of container formats include, without limitation, Docker containers, Linux containers (LXC), Solaris containers, etc. The code in a container 120 is "untrusted" because it originates from outside the platform 100 and may include malicious code (e.g., a virus, malware, etc.) and/or code that is otherwise detrimental to the operating environment (e.g., that consumes excessive computing resources).

For the supply pipeline 106 to ingest a container 120, a tenant 102 may supply credentials 110 (e.g., via a user interface 104) to allow the supply pipeline 106 to retrieve a container 120 from a separate container repository 108 that is external to the platform 100. The supply pipeline 106 may include a credential manager 116 configured to secure the tenant's credentials 110 using envelope encryption and/or another kind of security. The credential manager 116 may be configured to store the secured credentials in a credential repository 122. The supply pipeline 106 may include a tenant repository connector 114 configured (e.g., using an executable job) to connect to the container repository 108 using the supplied credentials 110 and obtain the container 120 from the repository 108. For example, the container repository 108 may be a Docker Repository, and the tenant credentials 110 may include information needed to access the Docker Repository, such as a uniform resource locator (URL) of the Docker Registry, a username, and a password. The supply pipeline 106 may be configured to store the container 120 in an internal container repository 124 that is part of the platform 100's infrastructure, such as an object store and/or a local registry.

2.1.1. Model Supply

In an embodiment, the supply pipeline 106 is configured to ingest a machine learning model 112 into the platform 100. A tenant 102 may upload a representation of the machine learning model 112 via a user interface 104. For example, the tenant 102 may upload a trained model 112 using an upload API 118 of the platform 100 that is accessible via the interface 104. The platform 100 may store the tenant-supplied model 112 in an internal model repository 126. For example, the platform 100 may store the tenant-supplied model 112 as a serialized binary or pickle file. As used herein, "pickle" (or "PKL") refers to the Python pickle module, which is configured to serialize and deserialize Python object structures. Other formats may be used.

In an embodiment, one or more model files supplied by the tenant include(s) information about one or more functions that can be applied to a target item/entity, to perform scoring and/or other machine learning functions. Thus, while the model file(s) may not include an immediately operational model, the platform 100 can recreate an operational model from the model file.

2.1.2. Scan and Certification Pipeline

In an embodiment, the scan and certification pipeline 128 is configured perform security scans on a container 120. An internal (also referred to as "local") container repository 124 may function as a "staging" repository for the container 120. The scan and certification pipeline 128 may include one or more security scanners 130 configured to execute one or more security scans on the container 120. A security scan may examine the container 120 for one or more of viruses, ransomware, malware, spyware, etc. A security scan may generate one or more security scan scores. One or more security scans may include an anti-virus scan configured to generate a report and/or a security scan score. The scan and certification pipeline 128 may be configured to compare a security scan score with a predetermined threshold value that indicates an acceptable level of security. If the security scan score does not satisfy the threshold value, then the scan and certification pipeline 128 may generate a message (e.g., a report indicating one or more security issues) and transmit the message to the tenant 102 (e.g., via the interface 104). In an embodiment, if each of the security scan scores satisfies the corresponding threshold value, then the scan and certification pipeline 128 certifies the container 120 by moving it from a staging area to a main/production area. To move the container 120 from staging, the scan and certification pipeline 128 may perform one or more of: moving the container 120 to a different repository (not shown); moving the container 120 to a different area of the same repository 124; and/or changing a flag or other indicator in the repository 124 to indicate that the container 120 is no longer in staging.

In an embodiment, the scan and certification pipeline 128 is configured perform security scans on a tenant-supplied model 112. An internal (also referred to as "local") model repository 126 may function as a "staging" repository for the model 112. The scan and certification pipeline 128 may include one or more security scanners 134 configured to execute one or more security scans on the container 120. A security scanner 134 used to scan a model 112 may be the same or different from a security scanner 130 used to scan a container 120. A security scan may examine the model 112 for one or more of viruses, ransomware, malware, spyware, etc. A security scan may generate one or more security scan scores. One or more security scans may include an anti-virus scan configured to generate a report and/or a security scan score. The scan and certification pipeline 128 may be configured to compare a security scan score with a predetermined threshold value that indicates an acceptable level of security. If the security scan score does not satisfy the threshold value, then the scan and certification pipeline 128 may generate a message (e.g., a report indicating one or more security issues) and transmit the message to the tenant 102 (e.g., via the interface 104). In an embodiment, if each of the security scan scores satisfies the corresponding threshold value, then the scan and certification pipeline 128 certifies the model 112 by moving it from a staging area to a main/production area. To move the model 112 from staging, the scan and certification pipeline 128 may perform one or more of: moving the model 112 to a different repository (not shown); moving the model 112 to a different area of the same repository 126; and/or changing a flag or other indicator in the repository 126 to indicate that the model 126 is no longer in staging.

2.1.3. Build and Deploy Pipeline

In an embodiment, the build and deploy pipeline 136 is configured to prepare a container for deployment. Operation of the build and deploy pipeline 136 may depend on what the tenant 102 provides. If the tenant 102 provides a model 112 without a tenant-supplied container, a container bundler 142 may bundle the model 112 with a default container 140, to generate a bundled container 144. If the tenant 102 provides a container 120, an endpoint verifier 138 may scan the container 120 to verify that it exposes the necessary endpoints for supplying inputs to and obtaining outputs from the model 112. The container bundler 142 may bundle the verified model 112 with the tenant-supplied container 120, to obtain a bundled container 144.

For example, if a model pickle file is provided, the build and deploy pipeline 136 may package the file into a Docker image (e.g., a default Docker image that was previously prepared and scanned for vulnerabilities) and generate a new container image bundled with the pickle file. If a Docker image and model pickle file are both provided, then the build and deploy pipeline 136 may ensure that the image exposes the necessary endpoints, then package the file into the tenant-supplied Docker image.

The build and deploy pipeline 136 may be configured to store the bundled container 144 in the internal model repository 126, internal container repository 124, and/or another storage location.

In an embodiment, the build and deploy pipeline 136 is configured to deploy the bundled container 144 to a runtime execution environment 146. For example, the runtime execution environment 146 may include a Kubernetes cluster within a virtual cloud network associated with the tenant 102. The runtime execution environment 146 may be unique to a specific tenant 102. Alternatively, the runtime execution environment 146 may be shared by multiple tenants of the platform 100. Examples of runtime execution environments are described in further detail below. To deploy the bundled container 144, the platform 100 may use an automation server. For example, the platform 100 may use Jenkins, which is a free, open-source automation server produced by Oracle International Corporation. The build and deploy pipeline 136 may also be configured to activate or "spin up" the bundled container 144 in the runtime execution environment 146 to which it was deployed.

2.1.4. Training Pipeline

In an embodiment, the training pipeline 148 configured to train a machine learning model. Training may occur after the bundled container 144, which includes the machine learning model, is deployed to the runtime execution environment 146 and before using the machine learning model on production data. Alternatively or additionally, training may occur on an ongoing basis, in a feedback loop that refines the machine learning model based on results obtained using production data.

In the training pipeline, 148 a scheduler 154 may be configured to trigger an orchestrator 152 to obtain information about the machine learning model. The orchestrator 152 is configured to activate or "spin up" an enterprise integrator model (not shown) for the pipeline. The enterprise integrator model is configured to activate or "spin up" a training job 150 (e.g., a Kubernetes job) to perform the training. The training job 150 executes to train the model and continues operating until one or more completion criteria is/are satisfied (e.g., all training data has been processed). The orchestrator 152 may be configured to poll for the status of any training job(s) 150.

2.1.5. Scoring Pipeline

In an embodiment, the scoring pipeline 156 is configured to perform scoring using a trained machine learning model in the runtime execution environment 146. Scoring generates one or more insights by applying the trained machine learning model to production data. Scoring is only one example of how a machine learning model may be used; other examples include, but are not limited to, generating one or more predictions and/or using the output of the model to continue training the model.

To perform scoring, an orchestrator (not shown) may initiate the scoring pipeline 156 (e.g., in a corresponding Kubernetes pod). The scoring pipeline 156 may be configured to pull data from one or more sources (e.g., one or more data platforms 162 that may be external to the platform 100), via a data platform API 160, and store the data in a tenant-specific data repository 164 (e.g., an object store associated with the tenant 102). The scoring pipeline 156 (e.g., code executing in a Kubernetes pod) is configured to obtain the data from the data repository 164 and apply the machine learning model to the data within the runtime execution environment 146. The scoring pipeline 156 may be configured to store the output of the machine learning model (e.g., newly scored data) in a repository within the platform and/or transmit the output to the external data source.

2.2. Network Isolation

In an embodiment, the secure modular machine learning platform 100 is configured to isolate tenants' untrusted code from each other. The platform 100 may be configured to execute an orchestrator on an existing cluster (e.g., a Kubernetes cluster), separate from the tenant-specific clusters. Tenant-specific clusters may be configured to execute only tenant-provided containers and/or machine learning models. The orchestrator may be configured to transmit instructions to the pipelines, to perform their respective functions.

In an embodiment, the orchestrator is configured to trigger tenant-specific machine learning models in tenant-specific clusters. Tenant-supplied code executing in tenant-specific clusters may be configured to utilize the respective tenant-specific machine learning model(s). The platform may be configured so that all communication with tenant-specific clusters (e.g., a call to initiate a scoring process) must come from the orchestrator's "master" cluster.

In an embodiment, each tenant's code executes in its own virtual cloud network (VCN). Each tenant's respective VCN may be separated from the others by firewall rules. Each VCN may be configured to accept only incoming data ("ingress") to the tenant-specific cluster. Alternatively or additionally, each cluster may expose only a limited set of ports for specific communication protocols. The platform 100 may not provide any mechanism to allow different tenants' respective VCNs to communicate with each other.

2.3. Data Storage

In one or more embodiments, the platform includes a data repository. A data repository is any type of storage unit and/or device (e.g., a file system, database, collection of tables, and/or any other storage mechanism) for storing data. The data repository may include multiple different storage units and/or devices. The multiple different storage units and/or devices may or may not be of the same type or located at the same physical site. The data repository may be implemented or executed on the same computing system as one or more other components illustrated in FIG. 1 and/or on a separate computing system. The data repository may be communicatively coupled to one or more other components via a direct connection or via a network. Information may be implemented across any of the components of the platform other than the data repository.

2.4. User Interface

In one or more embodiments, the platform 100 includes a user interface 104. A user interface 104 refers to hardware and/or software configured to facilitate communications between a user and one or more components of the platform 100. The interface 104 renders user interface elements and receives input via user interface elements. Examples of interfaces 104 include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of the interface 104 may be specified in different languages. For example, the behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, the interface 104 may be specified in one or more other languages, such as Java, Python, C, or C++.

Some examples of graphical user interfaces are described in further detail below.

2.5. Tenants

In one or more embodiments, a tenant 102 is a corporation, organization, enterprise, or other entity that accesses a shared computing resource, such as the secure modular machine learning platform 100. Multiple tenants may be independent from each other, such that a business or operation of one tenant is separate from a business or operation of another tenant. Some examples of multi-tenant architectures in accordance with one or more embodiments are described in further detail below.

2.6. Machine Learning

In one or more embodiments, a machine learning algorithm is an algorithm that can be iterated to learn a target model that best maps a set of input variables to one or more output variables, using a set of training data. The training data includes datasets and associated labels. The datasets are associated with input variables for the target model. The associated labels are associated with the output variable(s) of the target model. For example, a label associated with a dataset in the training data may indicate whether the dataset is in one of a set of possible data categories. The training data may be updated based on, for example, feedback on the accuracy of the current target model. Updated training data may be fed back into the machine learning algorithm, which may in turn update the target model.

A machine learning algorithm may generate a target model such that the target model best fits the datasets of the training data to the labels of the training data. Specifically, the machine learning algorithm may generate the target model such that when the target model is applied to the datasets of the training data, a maximum number of results determined by the target model match the labels of the training data. Different target models be generated based on different machine learning algorithms and/or different sets of training data.

The machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

3. Machine Learning

Figure 2:
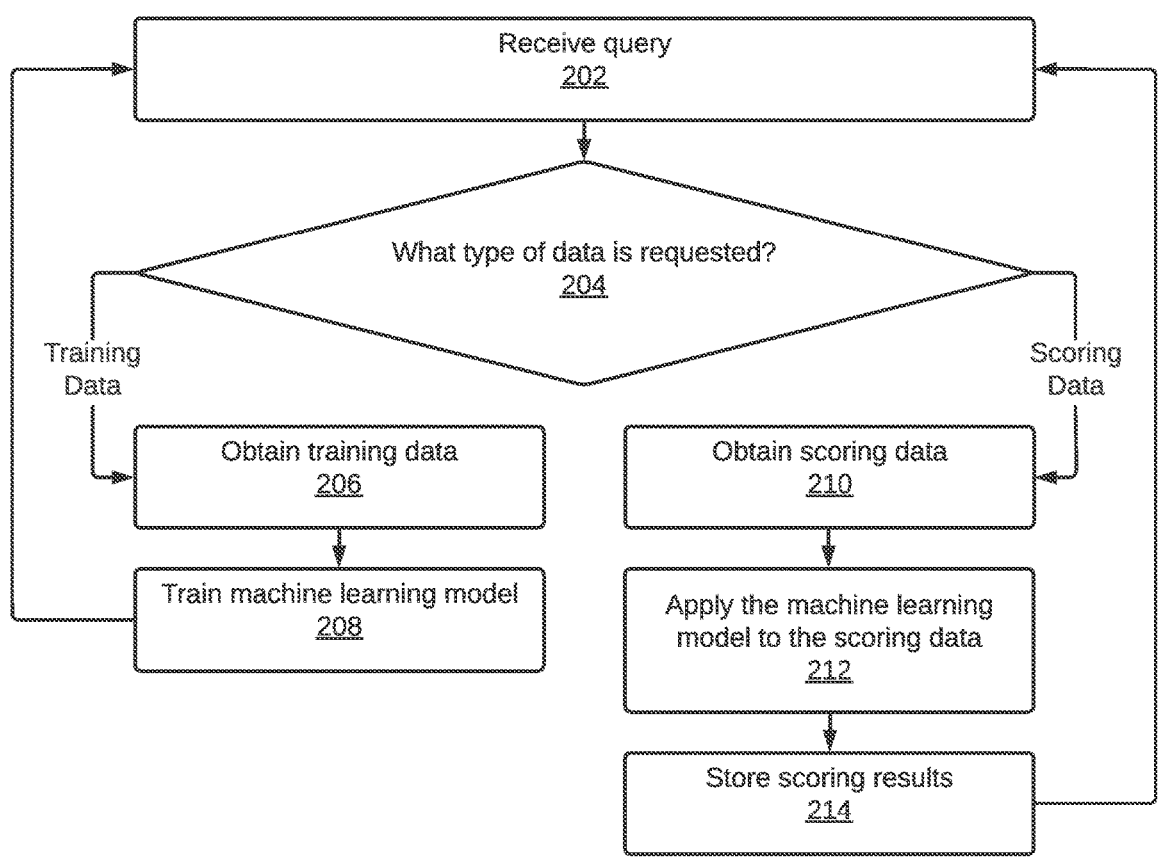
FIG. 2 illustrates an example set of operations for machine learning in accordance with one or more embodiments.

FIG. 2 illustrates an example set of operations for machine learning in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, the platform receives a query (Operation 202) to obtain some or all of the data available to a tenant. The platform may generate the query responsive to user input that defines one or more criteria for the query. The query may be for training data or scoring data (i.e., data to be scored using a trained model, such as production data).

The platform may determine which kind of data is requested in the query (Operation 204). If the query is for training data, the platform may execute the query to obtain the training data (Operation 206) and train the machine learning model (Operation 208) using the training data. Specifically, the platform supplies training data to an algorithm/model used to train a machine learning model. Training generates a coefficient/weight matrix map, where each coefficient/weight is mapped to a respective feature of the data. The outcome of the trained model is saved into a model file, the format of which depends on the underlying language support. For example, if the underlying model is written in python, the "pickle" (PKL) format may be used. The platform may subsequently receive another query (Operation 202) to obtain additional training data and/or scoring data.

If the query is for scoring data, the platform may execute the query to obtain the scoring data (Operation 210). The platform may apply the machine learning model to the scoring data 212 and store the scoring results (e.g., a scoring file) produced by the model (Operation 214). The platform may subsequently receive another query (Operation 202) to obtain additional training data and/or scoring data.

4. Machine Learning Model/Profile Configuration

Figure 3:
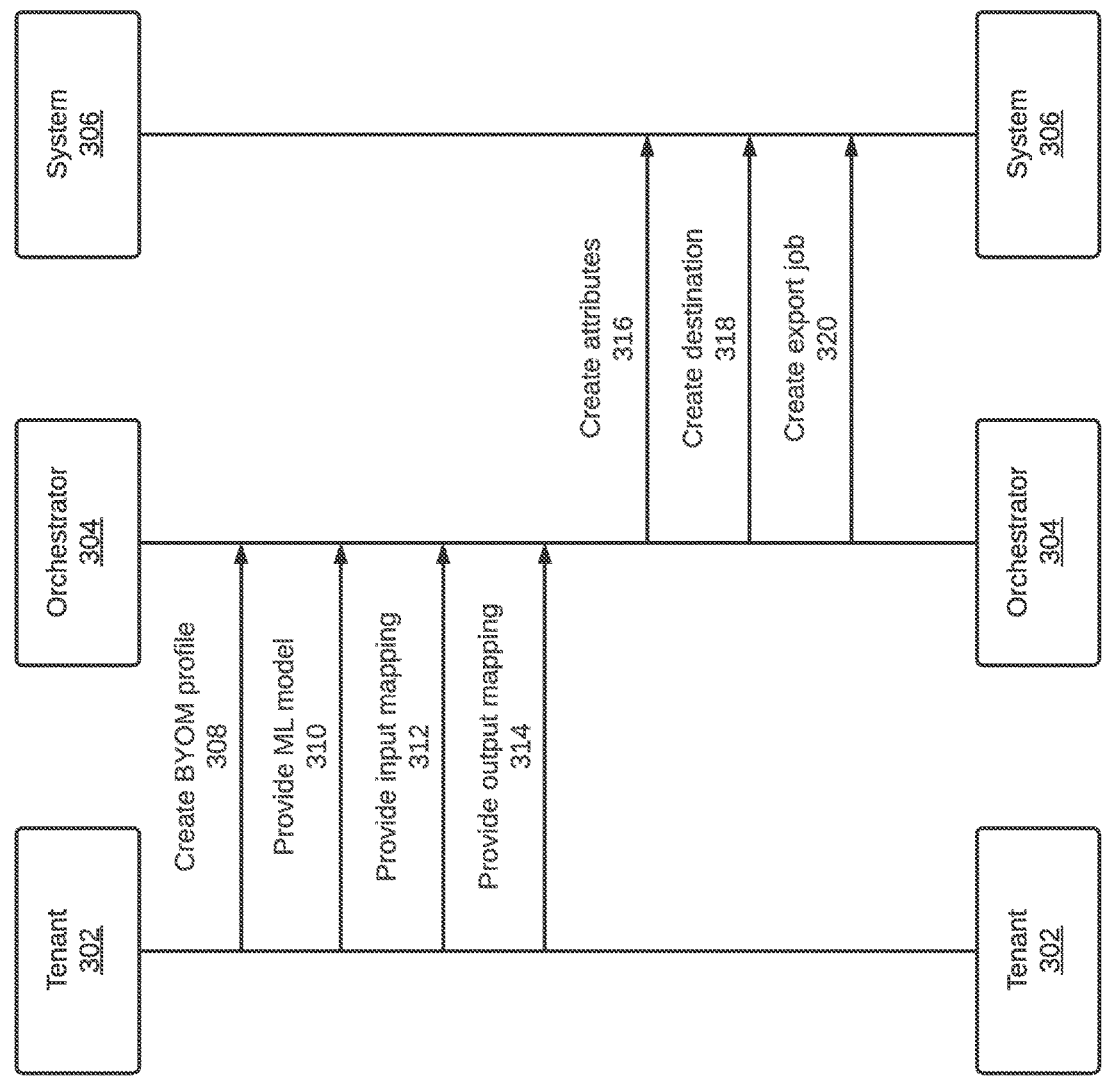
FIG. 3 illustrates an example set of operations for configuring a tenant's machine learning model/profile in accordance with one or more embodiments.

FIG. 3 illustrates an example set of operations for configuring a tenant's machine learning model/profile in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In the example illustrated in FIG. 3, the "tenant" 302 may refer to a user (e.g., an administrator) or process supplying data and/or instructions on behalf of a specific tenant. A tenant's model (referred to here as the BYOM model) may be a Dockerized machine learning algorithm that is configured to consume certain input data in a specified format or formats, process the data according to the packaged algorithm and providing outcomes—for example, a training model file (e.g., a PKL file) or scored model outcomes for a set of input attributes based on the model file.

To create a BYOM model/profile, the tenant 302 supplies instructions to an orchestrator 304, via a system API, to create a BYOM profile (Operation 308). The tenant 302 further provides a machine learning algorithm and/or other representation of a machine learning model (Operation 310), an input mapping that maps outputs of the model to inputs of the platform (Operation 312), and an output mapping that maps inputs of the model to outputs of the platform (Operation 314).

Responsive to the information provided by the tenant 302, the orchestrator 304 instructs the system 306 to create the attributes required to train or score the model (Operation 316). The orchestrator 304 further instructs the system to create a destination (e.g., a cluster) for the model (Operation 318) and an export job to obtain data for the BYOM container(s) (Operation 320).

In an embodiment, responsive to the tenant 302 providing the model input attributes (which may correspond to the features in the model), the system 306 determines which of the output attributes correspond to predicted values. These output attributes may also be mapped to existing attributes.

5. Tenant Isolation

Figure 4:
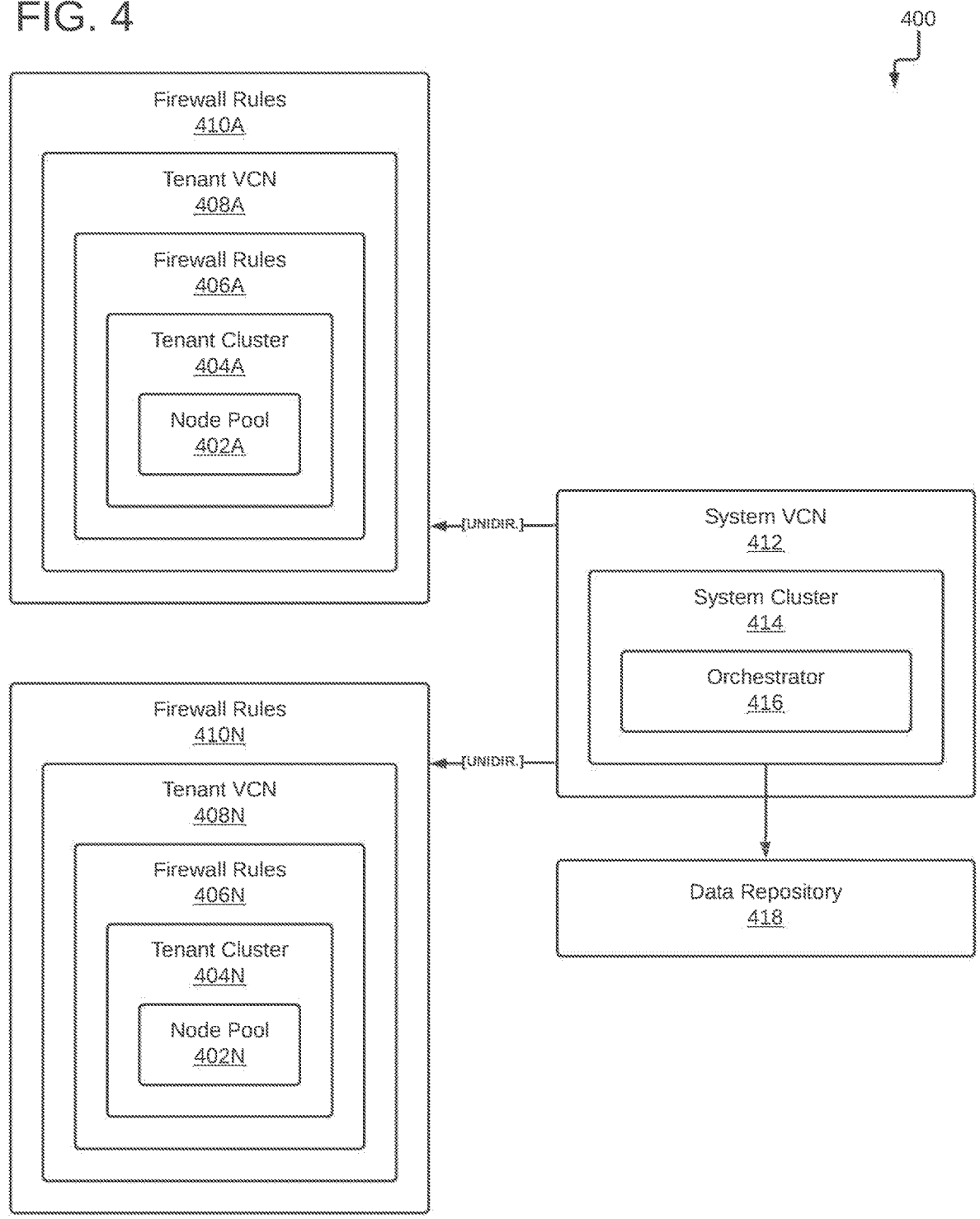
FIG. 4 shows a block diagram that illustrates an example of a cluster configuration in accordance with one or more embodiments.

FIG. 4 shows a block diagram that illustrates an example of a cluster configuration 400 in accordance with one or more embodiments. In one or more embodiments, the cluster configuration 400 may include more or fewer components than the components illustrated in FIG. 4. The components illustrated in FIG. 4 may be local to or remote from each other. The components illustrated in FIG. 4 may be implemented in software and/or hardware. Each component may be distributed over multiple applications and/or machines. Multiple components may be combined into one application and/or machine. Operations described with respect to one component may instead be performed by another component.

As illustrated in FIG. 4, the cluster configuration 400 includes: tenant-specific VCNs 408A-N; tenant-specific clusters 404A-N (e.g., using Oracle Cloud Infrastructure Container Engine for Kubernetes (OKE)); and tenant-specific node pools 402A-N. Each VCN 408A-N is protected by firewall rules 410A-N. Each cluster 404A-N is further protected by another layer of firewall rules 406A-N, including port restrictions.

In an embodiment, a system VCN 412 (e.g., an Oracle Data Sciences VCN) includes a system cluster 414 (e.g., an Oracle Data Sciences OKE Cluster), which hosts an orchestrator 416. The system VCN 412 is configured to communicate unidirectionally with the tenant VCNs 408A-N. In addition, the orchestrator 416 is configured to communicate with a data repository 418 (e.g., an Autonomous Transaction Processing (ATP) database system).

In an embodiment, each tenant's respective VCN 408A-N is hosted on a respective physical machine (i.e., separate bare metal deployments), thus adding physical separation to logical separation.

6. Deploying Untrusted Code

Figure 5:
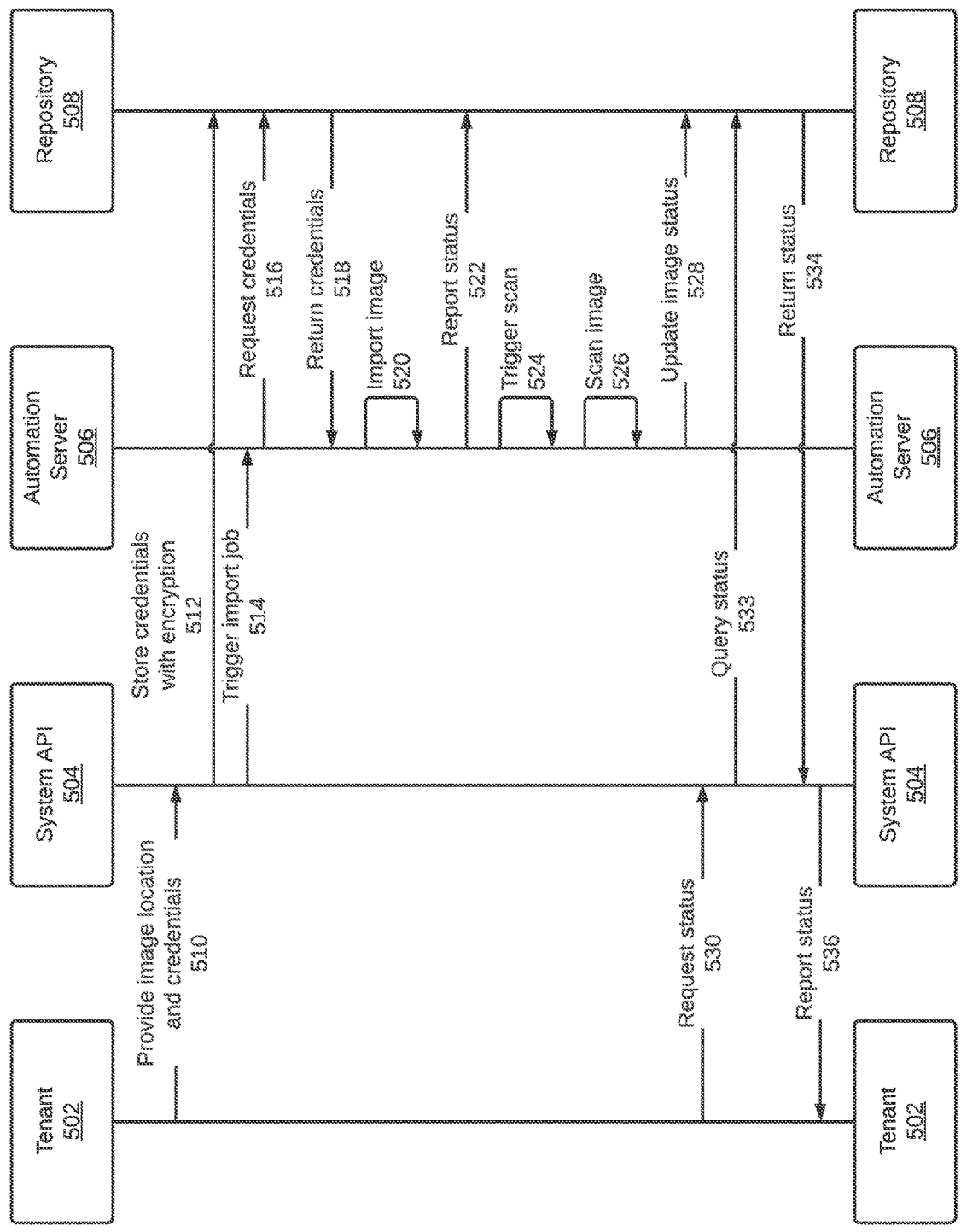
FIG. 5 illustrates an example set of operations for deploying a set of untrusted code supplied by a tenant in accordance with one or more embodiments.

FIG. 5 illustrates an example set of operations for deploying a set of untrusted code supplied by a tenant in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

Initially, a tenant 502 supplies the location of a container image and credentials for accessing the image (Operation 510) to the platform, via a system API 504. The platform stores the credentials, with encryption, in a repository 508 (Operation 512).

When the system API 504 triggers an import job (Operation 514), an automation server 506 requests credentials from the repository (Operation 516) and receives the returned credentials (Operation 518). The platform uses the credentials to import the image (e.g., a Docker image) (Operation 520), and reports a status back to the repository (Operation 522).

A successful import triggers a security scan of the image (Operation 524). The platform scans the image (Operation 526). Post-scan, the automation server 506 updates a status of the image (e.g., passed or failed the security scan) to the repository 508 (Operation 528).

Responsive to a tenant 502 requesting a status via the system API 504 (Operation 530), the platform queries the status from the repository 508 (Operation 533), receives the status from the repository 508 (Operation 534), and reports the status to the tenant 502 (Operation 536).

7. Training a Machine Learning Model

Figure 6:
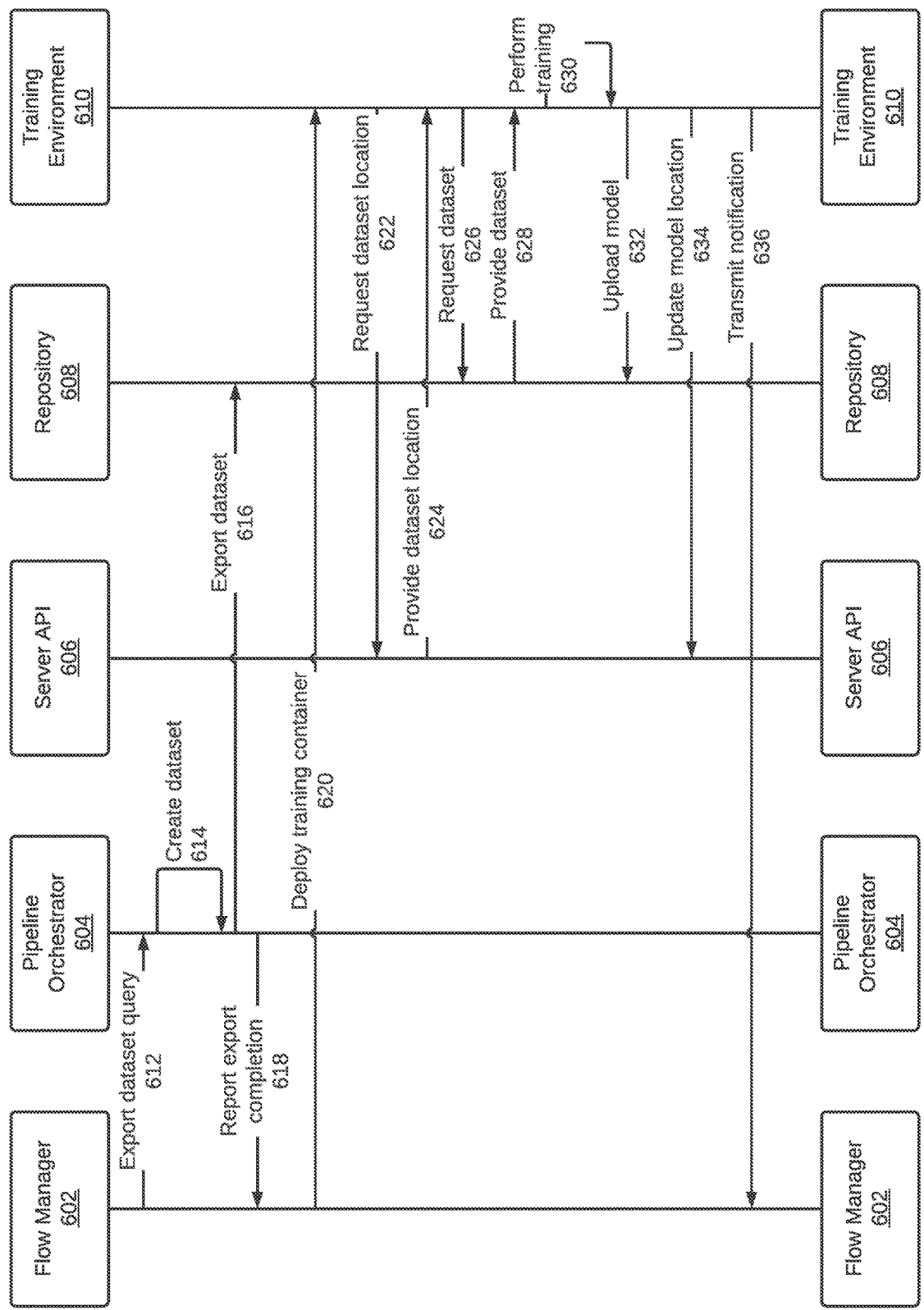
FIG. 6 illustrates an example set of operations for training a machine learning model in accordance with one or more embodiments.

FIG. 6 illustrates an example set of operations for training a machine learning model in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In the example illustrated in FIG. 6, the flow manager 602 refers to a component that is configured to handle orchestration and scheduling, and the pipeline orchestrator 604 refers to a component in the platform that is configured to handle data pipelines and orchestration for the data loads.

In an embodiment, the flow manager 602 exports a dataset query to the pipeline orchestrator 604 (Operation 612). Responsive to receiving the query, the pipeline orchestrator 604 creates a dataset (Operation 614) from the delimiter-separate values (DSV), exports the dataset to a repository 608 (e.g., an object store) (Operation 616), and notifies the flow manager 602 that the data export is complete (Operation 618).

The flow manager 602 deploys a training container to a training environment 610 (i.e., a set of components in the platform configured to perform training) (Operation 620). The training environment 610 requests a dataset location from the server API 606 (Operation 622) and receives the location in response (Operation 624). The training environment requests the dataset from the provided location (Operation 626), receives the dataset (Operation 628), and performs training using the dataset as training data (Operation 630). The training environment 610 uploads the resulting output (e.g., a pickle file) to the repository 608 (Operation 632) and provides the location of the model to the server API (Operation 634). The training environment 610 notifies the flow manager 602 that training is complete (Operation 636).

8. Applying a Machine Learning Model

Figure 7A:
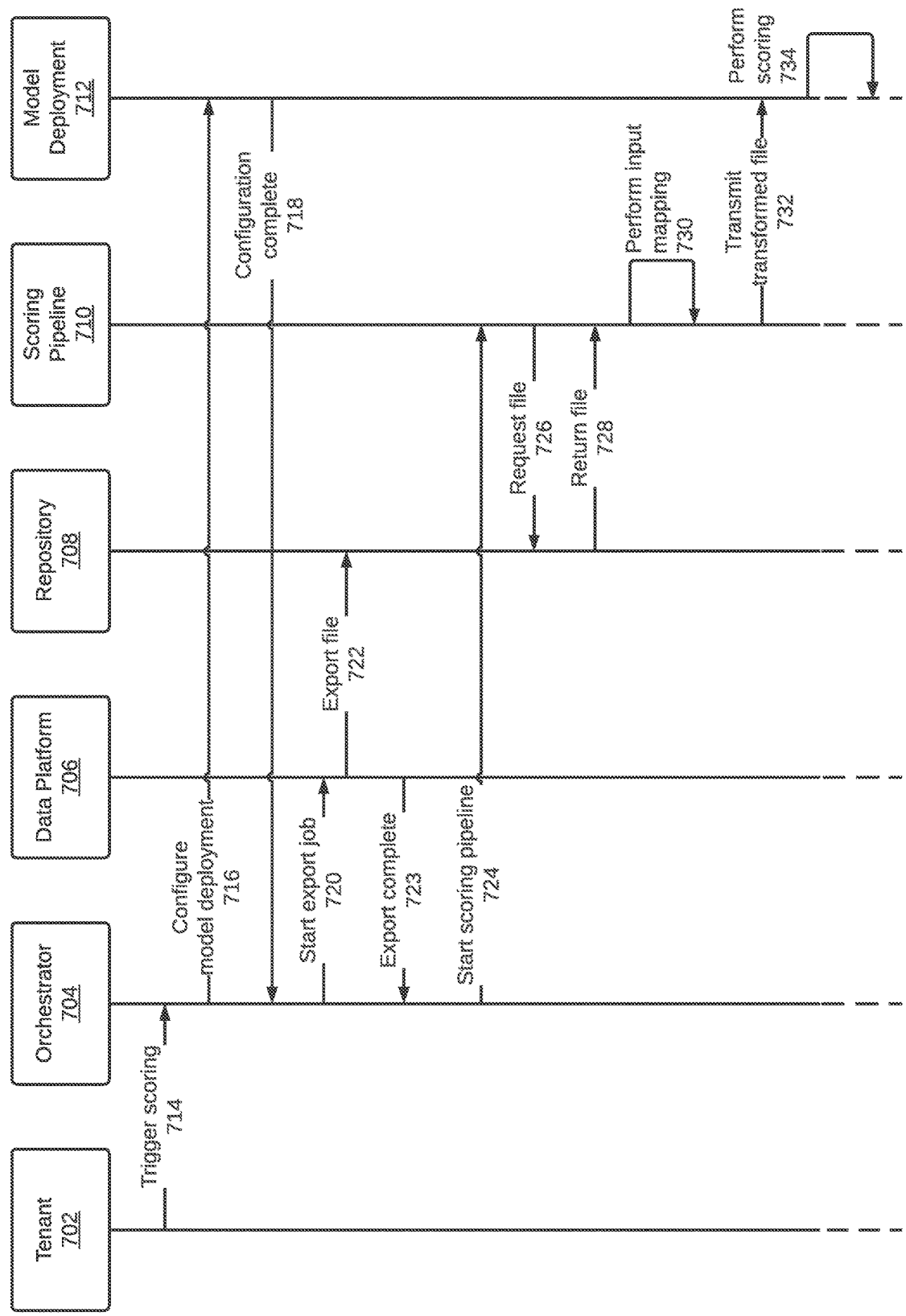
FIGS. 7A-7B illustrate an example set of operations for applying a machine learning model in accordance with one or more embodiments.
Figure 7B:
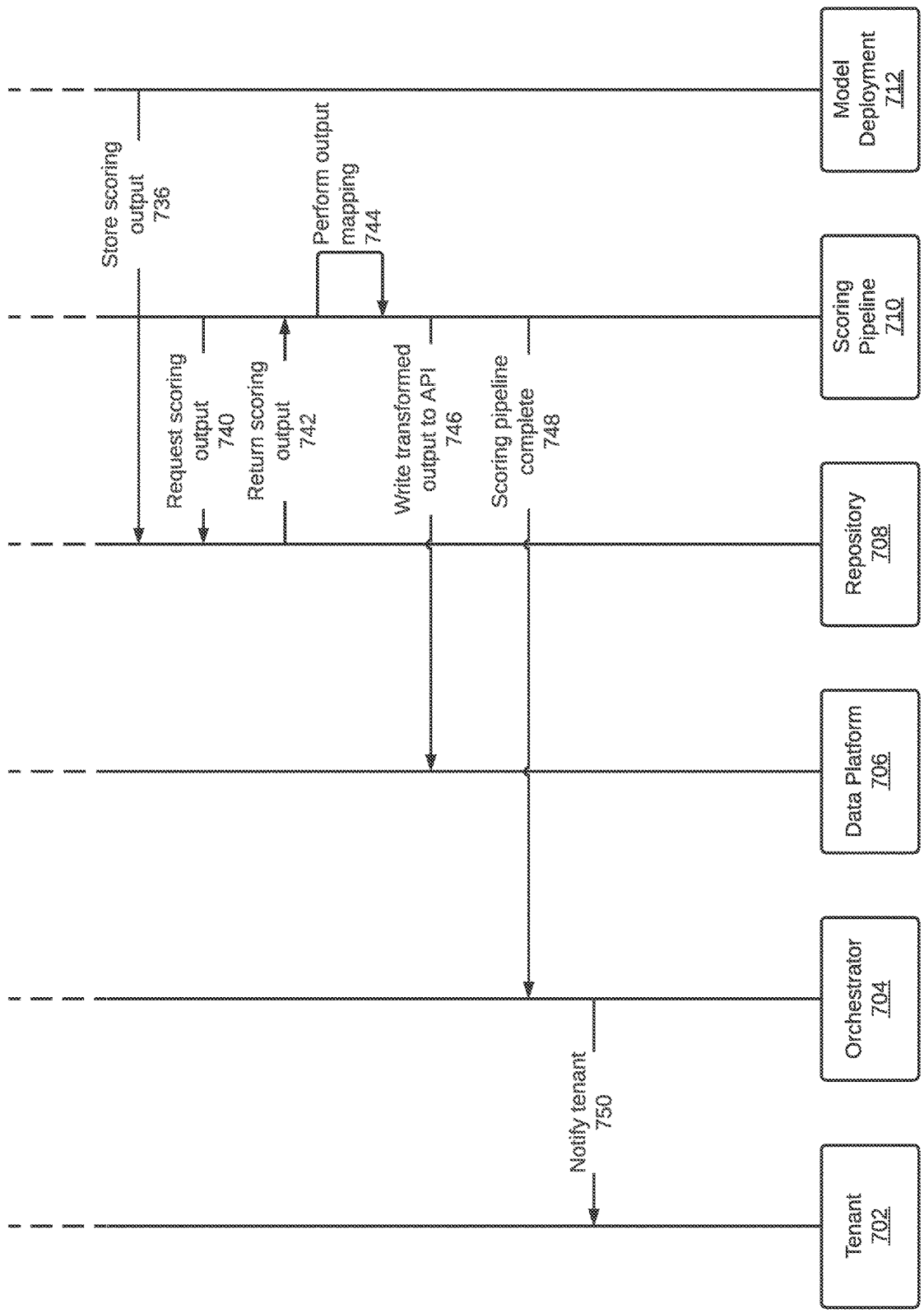

FIGS. 7A-7B illustrate an example set of operations for applying a machine learning model in accordance with one or more embodiments. One or more operations illustrated in FIGS. 7A-7B may be modified, rearranged, or omitted all together. Accordingly, the particular sequence of operations illustrated in FIGS. 7A-7B should not be construed as limiting the scope of one or more embodiments.

In an embodiment, a tenant 702 triggers a scoring job, via the server API 704 (Operation 714). The orchestrator 704 configures model deployment 712 (Operation 716), if necessary, and model deployment 712 notifies the orchestrator 704 when the configuration is complete (Operation 718). The orchestrator 704 then instructs the data platform 706 to start an export job (Operation 720), and the data platform 706 exports the resulting file to a data repository 708) (e.g., an object store). The data platform 706 notifies the orchestrator 704 when the export job is complete (Operation 723). The orchestrator 704 starts the scoring pipeline 710 (Operation 724), which requests the exported file from the repository 708 (Operation 726) and receives the returned file (Operation 728). The scoring pipeline 710 performs input mapping on the file (Operation 730) and sends the transformed file to model deployment 712 (Operation 732), which performs scoring on the transformed file (Operation 734). Model deployment 712 stores the scoring output to the repository (Operation 736). The scoring pipeline 710 requests the scoring output from the repository 708 (Operation 740), receives the returned scoring output (Operation 742), performs output mapping (Operation 744), and writes the transformed output to data platform 706's streaming API (Operation 746). The scoring pipeline 710 notifies the orchestrator 704 that scoring is complete (Operation 748), and the orchestrator 704 in turn notifies the tenant 702 (Operation 750).

9. Example Graphical User Interfaces

Figure 8A:
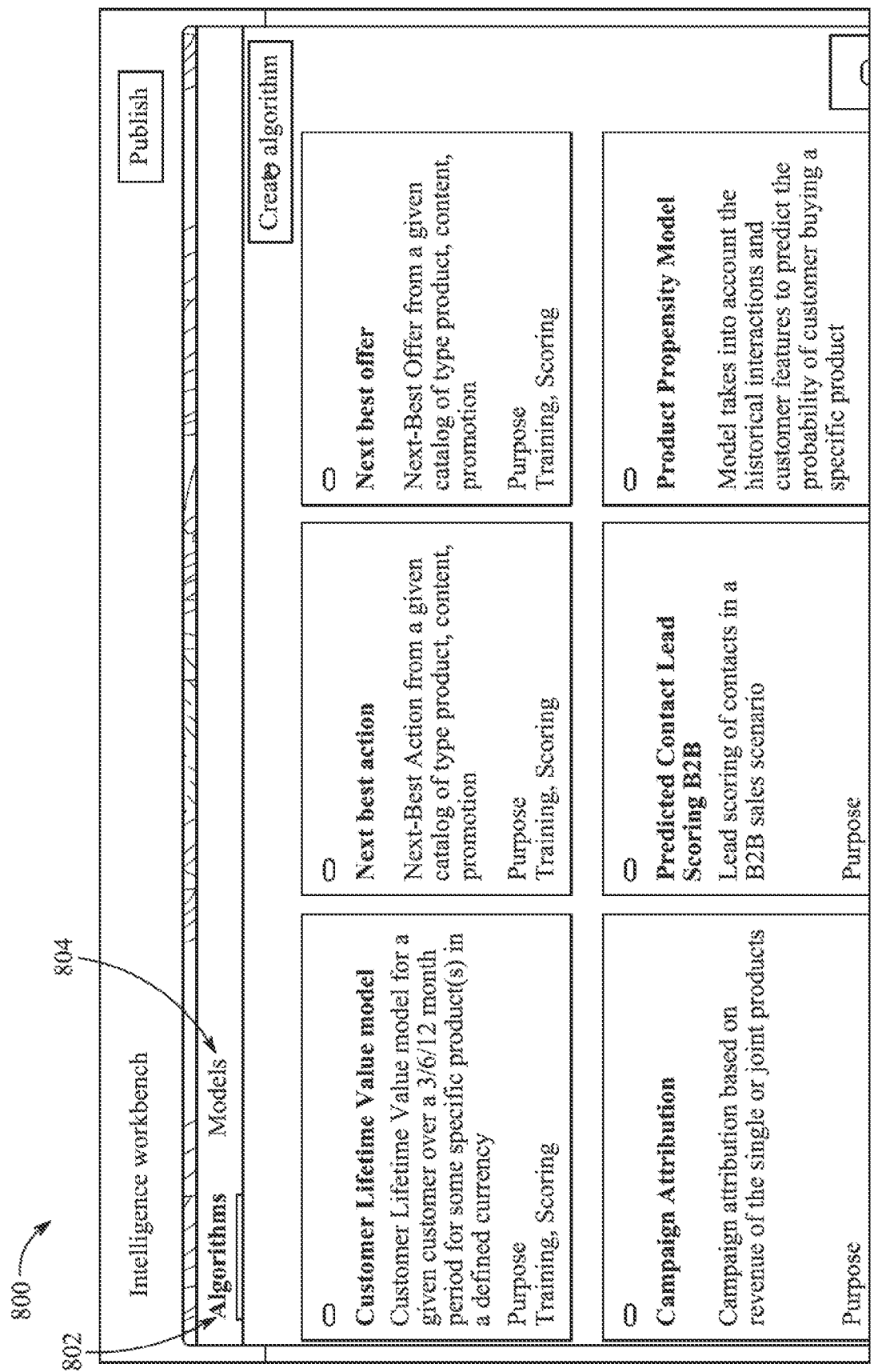
FIGS. 8A-8O illustrate examples of graphical user interfaces in accordance with one or more embodiments.

FIGS. 8A-8O illustrate examples of graphical user interfaces (GUIs) in accordance with one or more embodiments. These examples are provided for illustrative purposes only and should not be construed as limiting the scope of one or more embodiments.

In the examples illustrated in FIGS. 8A-8O, the machine learning platform is a software-as-a-service (SaaS) product made available via a web browser interface. The user is assumed to be an administrator associated with a particular tenant.

FIG. 8A illustrates an example of a dashboard GUI 800 that presents options for configuring and using machine learning on the platform. In FIG. 8A, an "algorithms" tab 802 is currently selected, where the user can select from among various algorithms that use one or more machine learning models. A separate "models" tab 804, when selected, allows the user to configure the model(s).

Figure 8B:
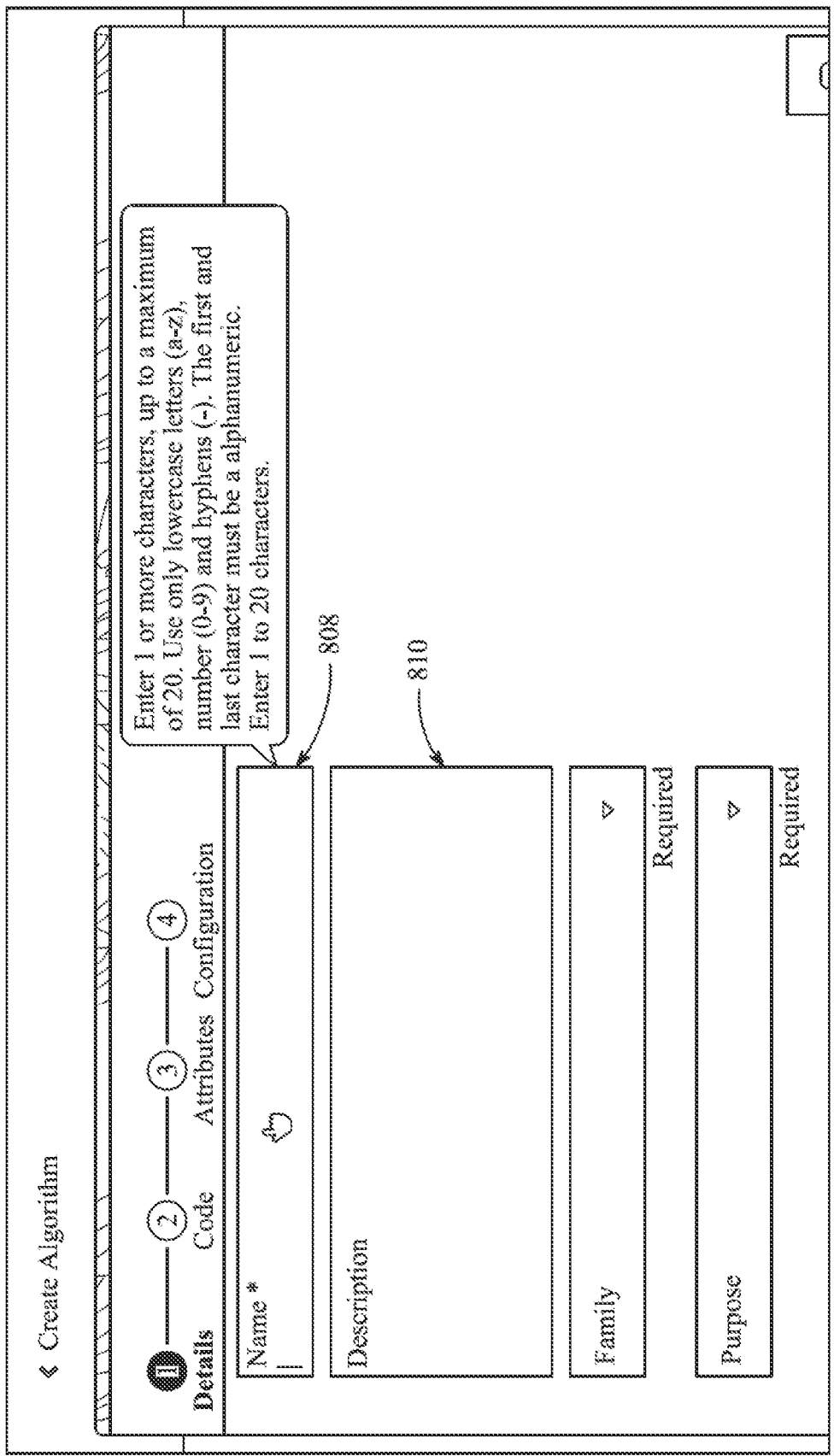
Figure 8C:
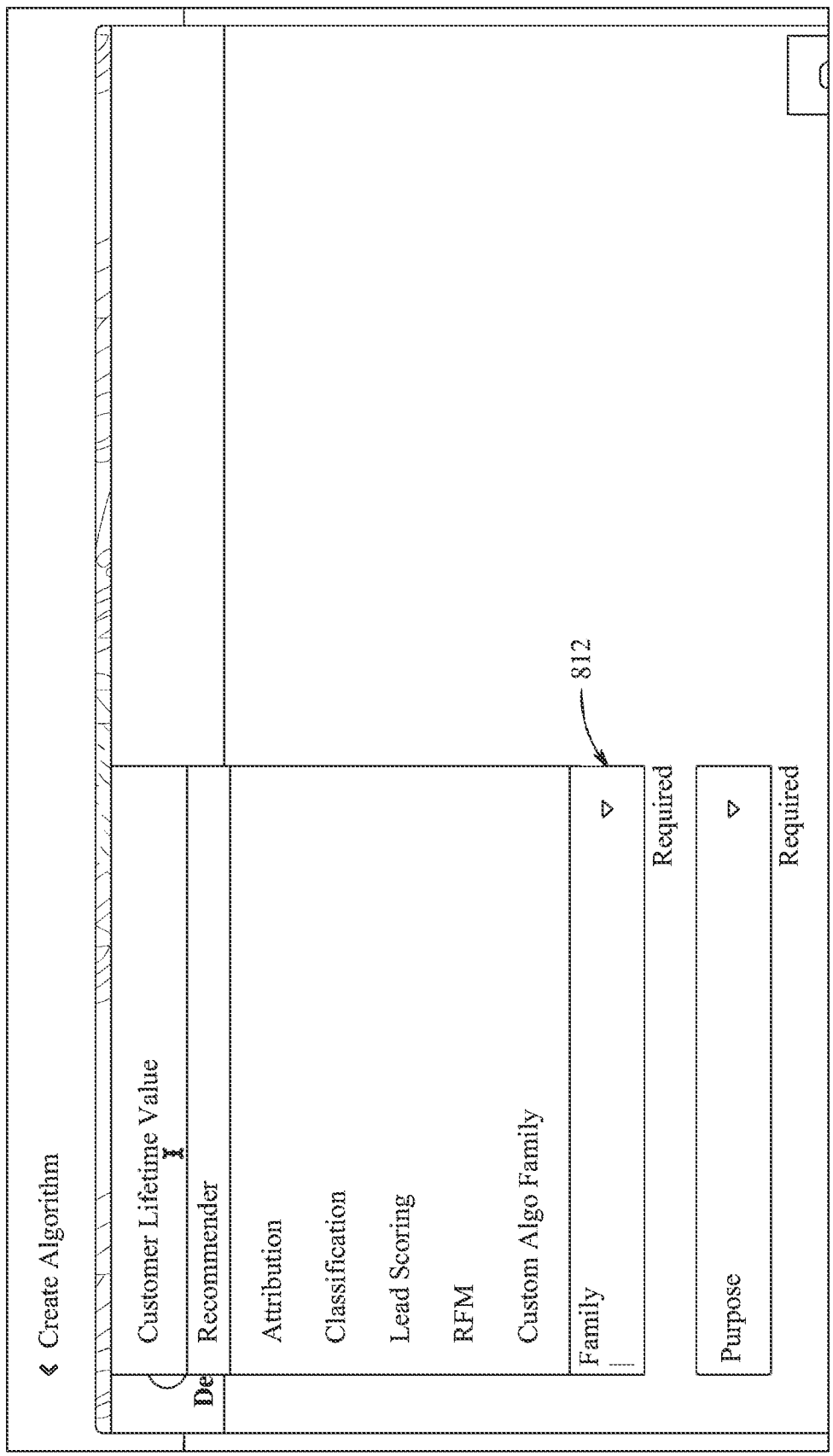

FIGS. 8B-8D illustrates an example of a GUI 806 for entering information about an algorithm. The screen shown in FIGS. 8B-8D is the first step ("details") in a 4-step process that includes details, code, attributes, and configuration. As shown in FIGS. 8B-3D, on the details screen, the user can enter a name 808 and description 810 of the algorithm, assign the algorithm to a family 812, and indicate the algorithm's purpose 814.

FIG. 8E illustrates an example of a GUI 816 for supplying untrusted code that uses a machine learning model. In this example, the user can indicate the location 818 (e.g., a URL) where a Docker container image can be found, as well as a username 820 and password 822 for accessing that location. In addition, an upload interface 824 allows the user to upload a JavaScript Object Notation (JSON) or other kind of file that defines a machine learning model. The model file may use a platform-agnostic schema that can be mapped to inputs and outputs of the algorithm.

FIGS. 8F and 8G illustrates an example of a GUI 826 for mapping inputs 828 and outputs 830, i.e., inputs to the algorithm and outputs of the algorithm resulting from scoring. In this example, the algorithm is configured to use a machine learning model to obtain a height estimate based on an individual's age and weight. In FIG. 8G, the age input 832 and weight input 834 have been configured, and the height output 836 is in the process of being configured.

Figure 8H:
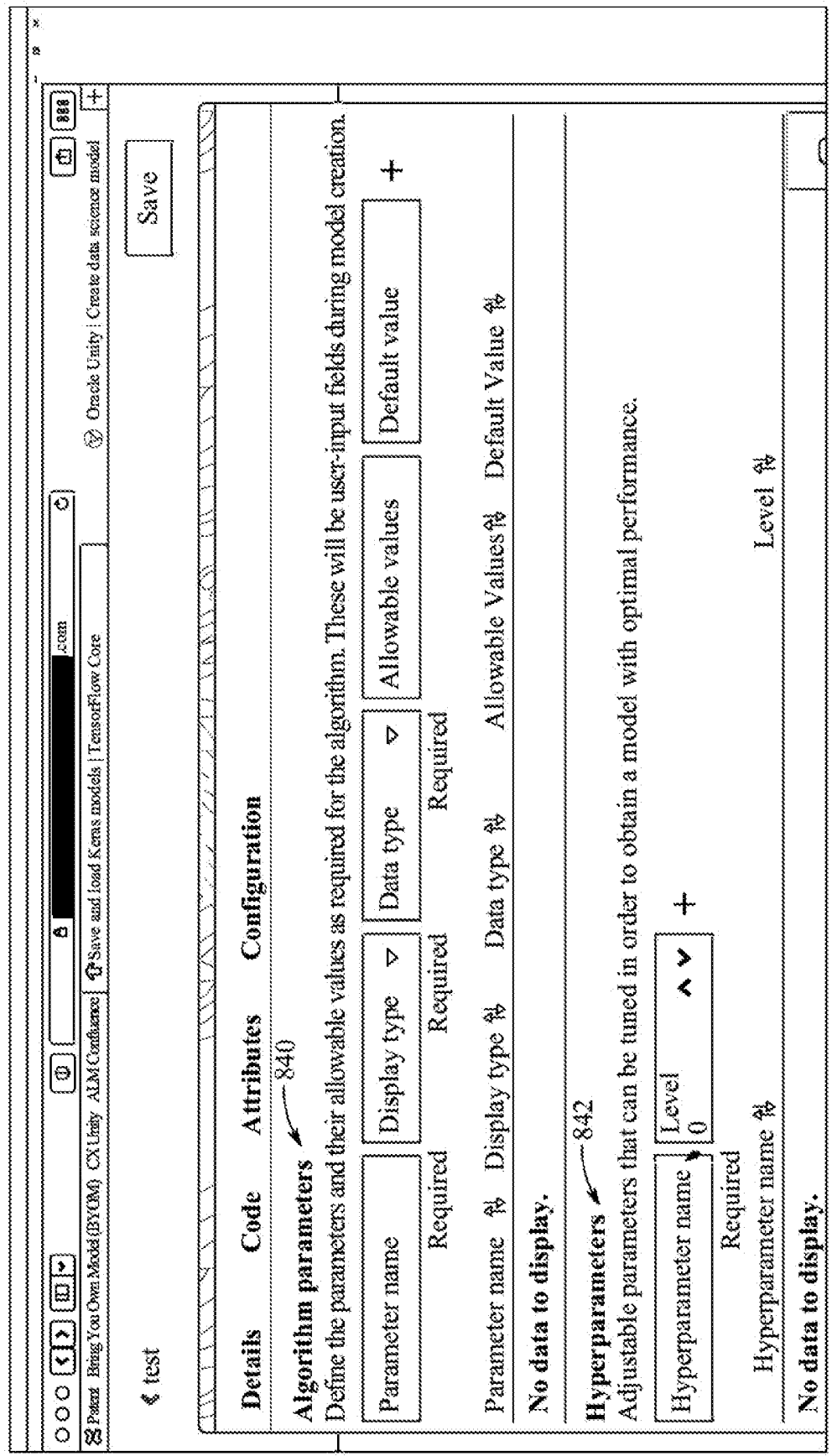

FIG. 8H illustrates an example of a GUI 838 for configuring parameters 840 and their allowable values for the algorithm, and hyperparameter tunings 842 for the machine learning model.

FIG. 8I illustrates an example of a GUI 844 for the "models" tab 846, which in this example presents a list of available models.

Figure 8J:
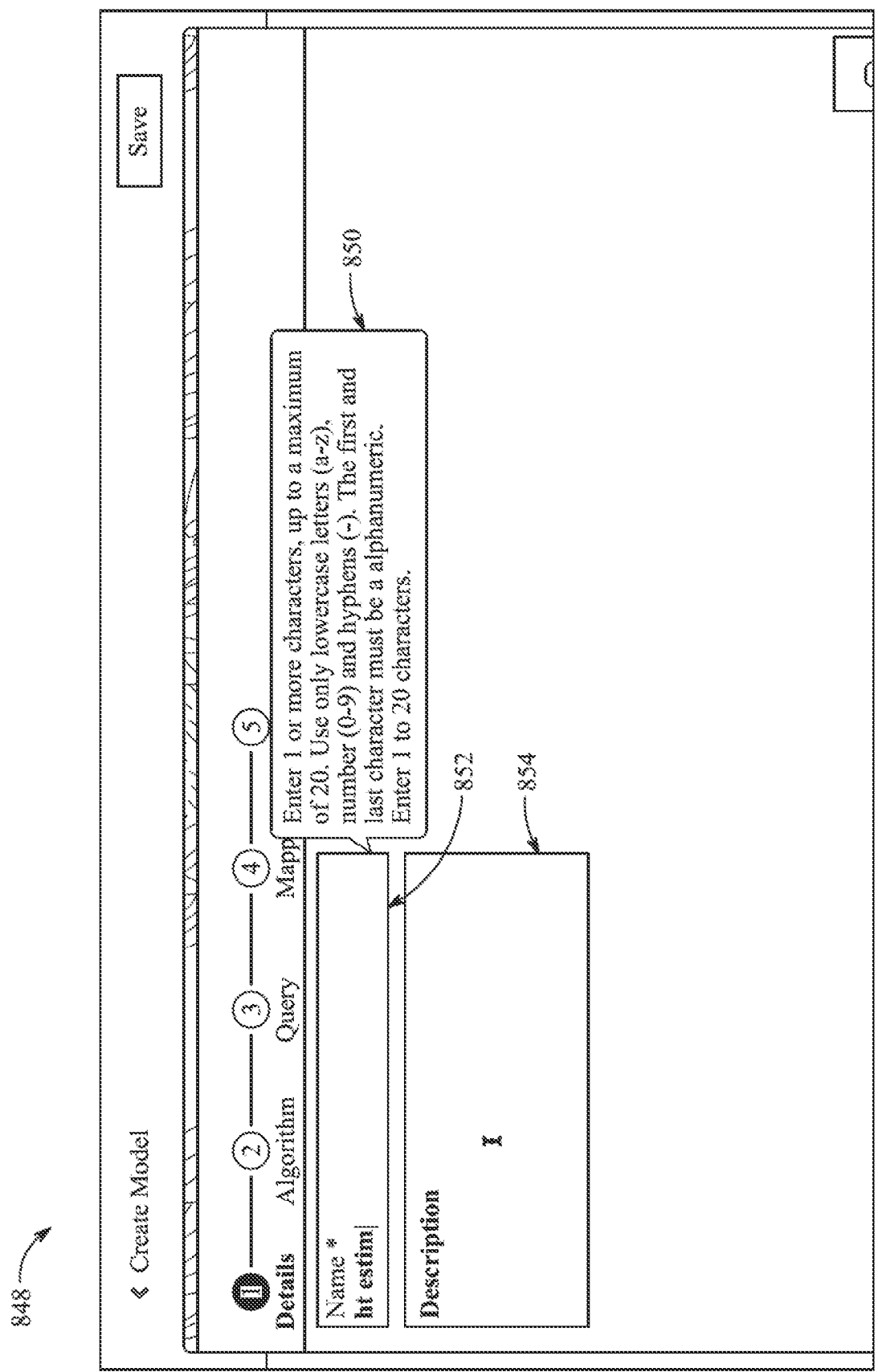

FIG. 8J illustrates an example of a GUI 848 for creating a new model. The screen shown in FIG. 8J is the first step ("Details") in a 5-step process that includes details, algorithm, query, mapping, and schedule (the latter being concealed by the tooltip 850 in FIG. 8J). On the details screen shown in FIG. 8J, the user can enter a name 852 and description 854 of the model.

Figure 8K:
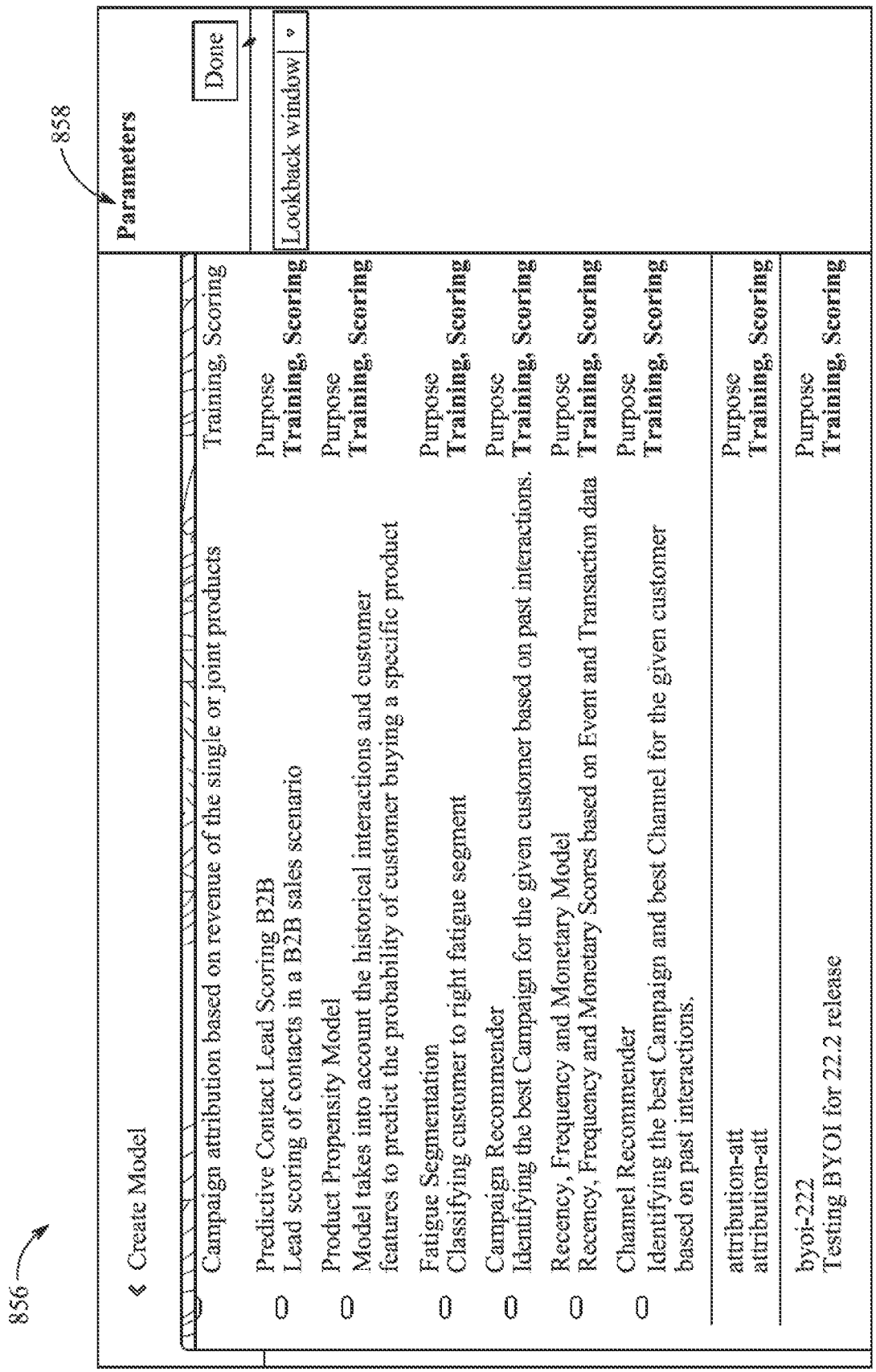

FIG. 8K illustrates an example of a GUI 856 for configuring parameters 858 of a model, in this case including a lookback window that defines the temporal scope of data to use in the model.

Figure 8L:
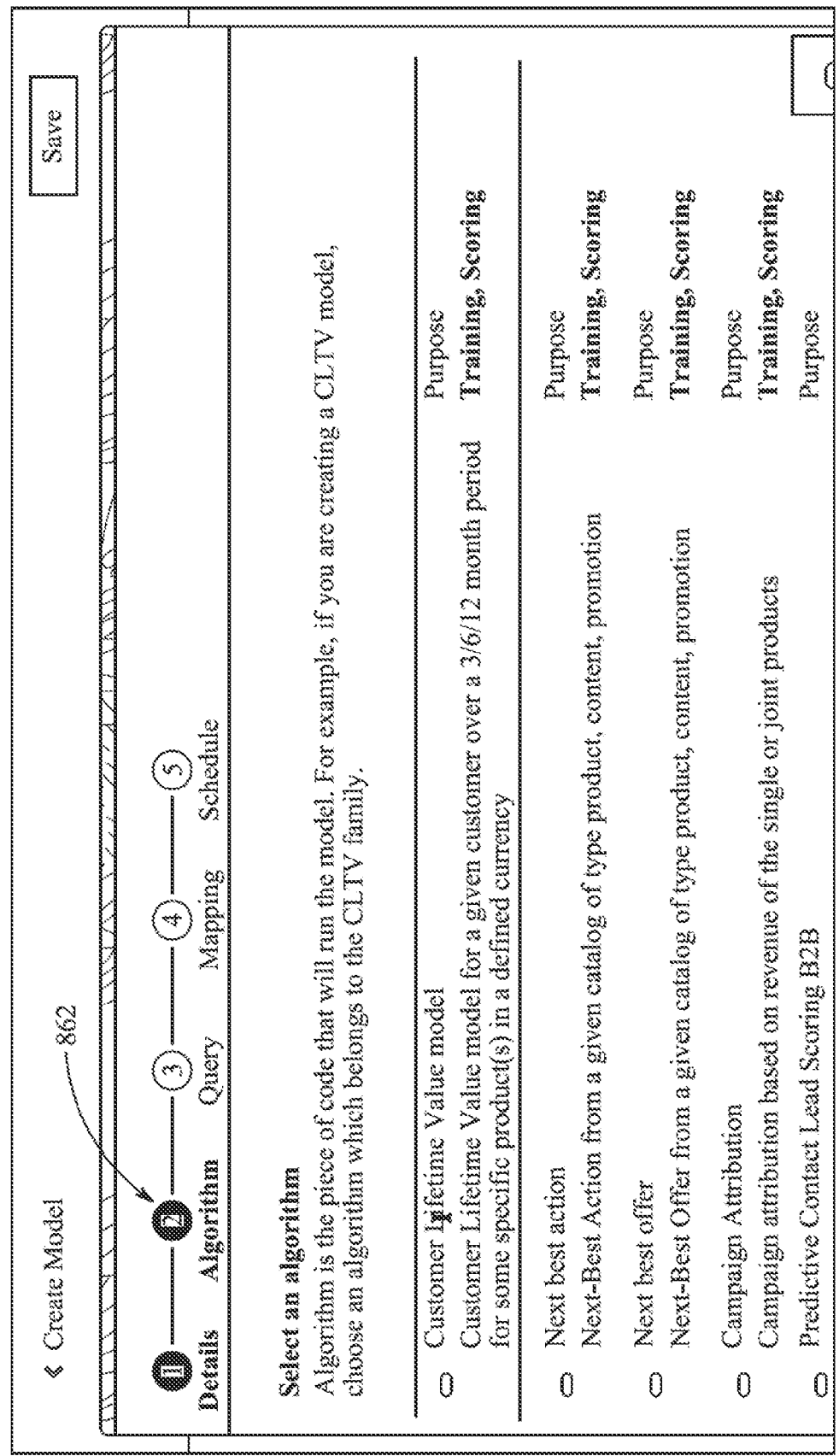

FIG. 8L illustrates an example of a GUI 860, in which the algorithm tab 862 is selected, for selecting an algorithm to use with a model. As shown in FIG. 8L, the algorithm is the set of untrusted code that uses the model.

Figure 8M:
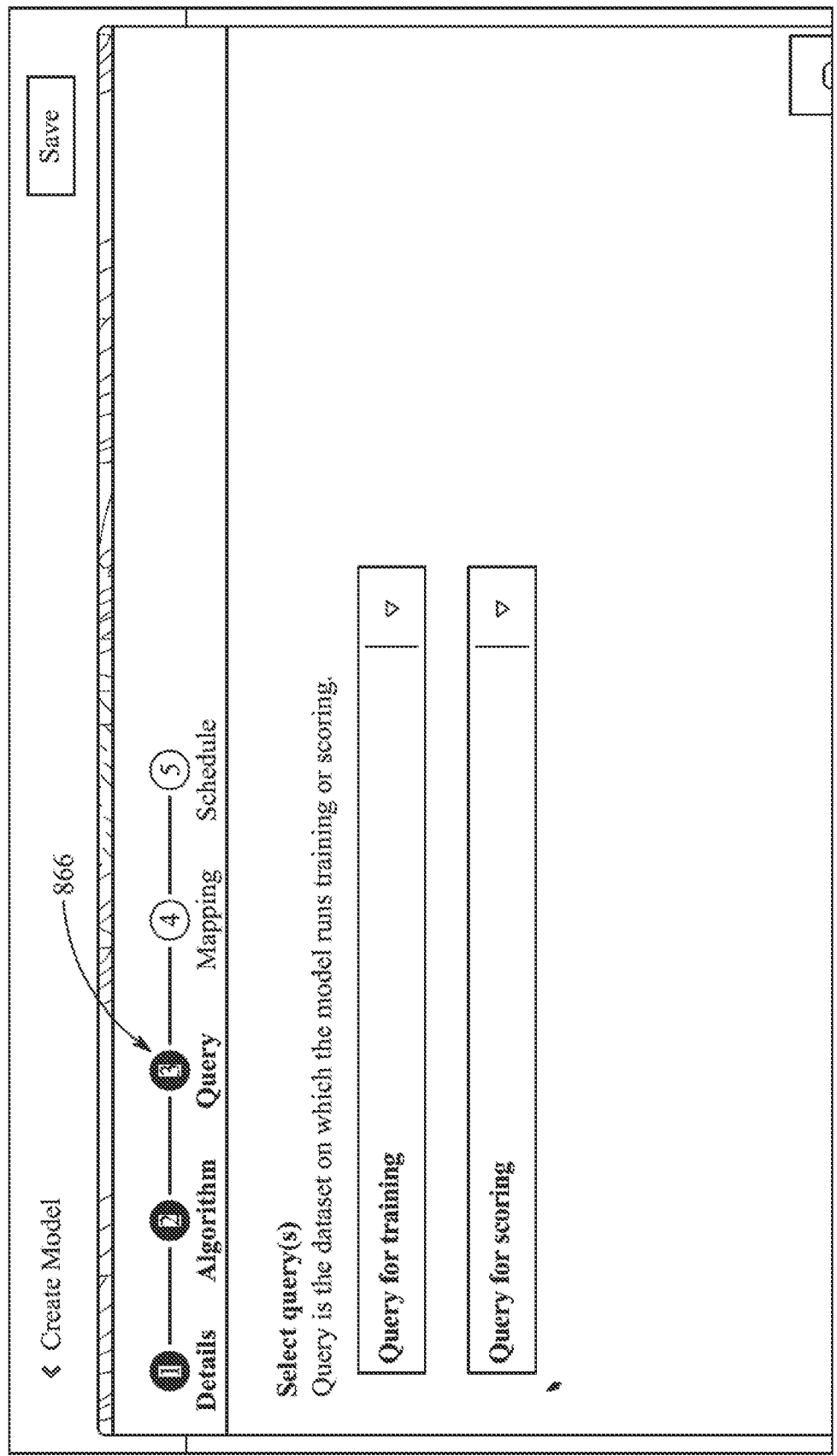
Figure 80:
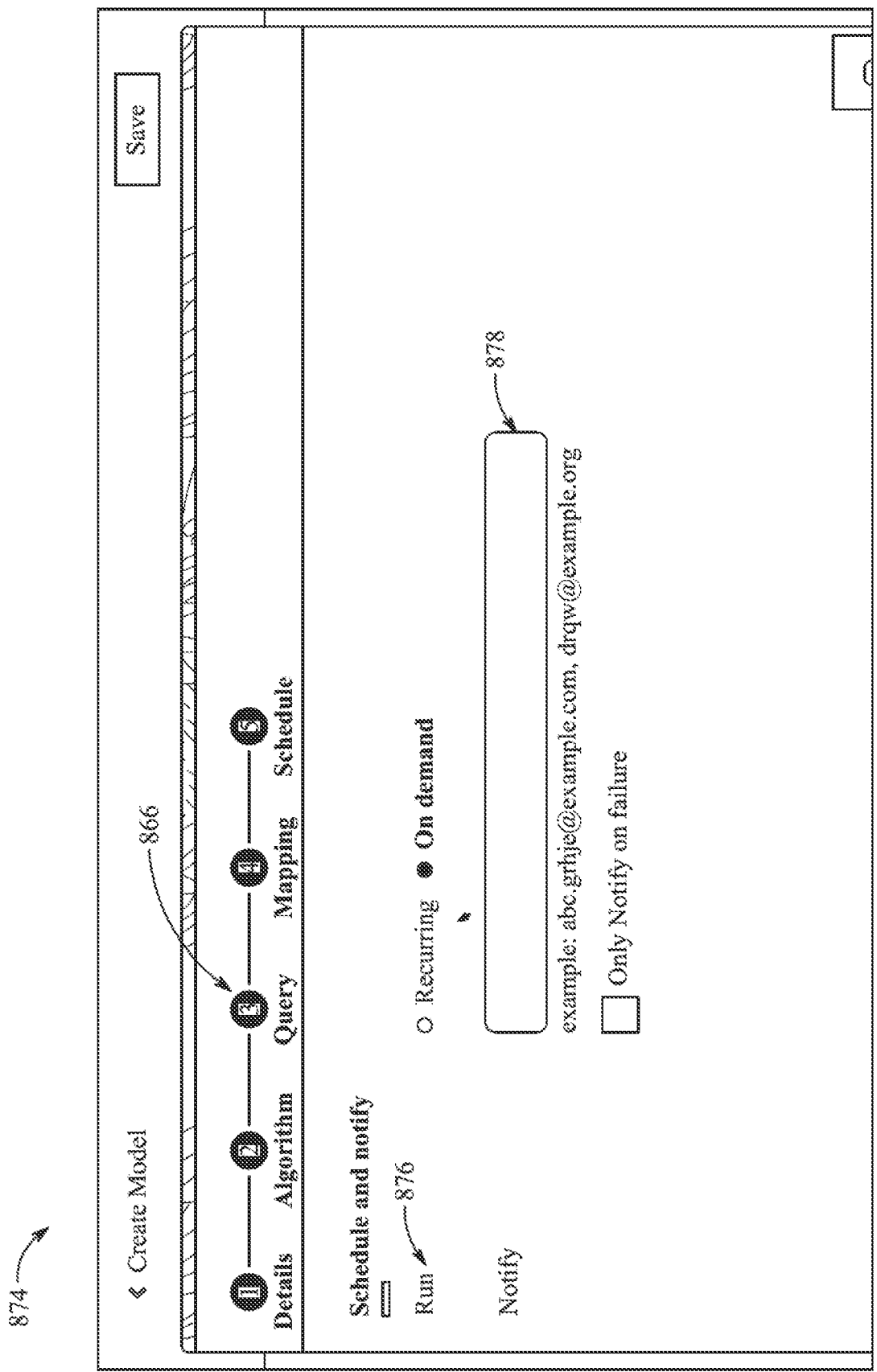

FIG. 8M illustrates an example of a GUI 864, in which the query tab 866 is selected, for selecting one or more queries that obtain data for training the model and/or performing scoring using the trained model.

FIG. 8N illustrates an example of a GUI 868 for mapping inputs 870 (i.e., mapping attributes of the algorithm to query attributes) and outputs 872 (i.e., mapping outputs of the algorithm to system variables).

FIG. 8O illustrates an example of a GUI 874 for setting a schedule 876 for executing the algorithm that uses the model. In this example, the algorithm executes only on demand. Alternatively, a recurring schedule may be designated. In addition, the GUI 874 illustrated in FIG. 8O allows the user to provide one or more email addresses 878 to receive notifications. The user may select to receive notifications only when a failure condition is encountered.

10. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

11. Microservice Applications

In one or more embodiments, techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally include a single logical executable. With microservice applications, different microservices are independently deployable as separate executables. Microservices may communicate using Hypertext Transfer Protocol (HTTP) messages and/or according to other communication protocols via Application Programming Interface (API) endpoints. Microservices may be managed and updated separately, written in different languages, and executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

Microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

11.1. Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects that a value has crossed a triggering threshold.

A trigger, when satisfied, may output data for consumption by the target microservice. Alternatively or additionally, when satisfied, a trigger may output a binary value indicating that the trigger has been satisfied, and/or may output the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

11.2. Actions

A plugged-in microservice application may expose actions to the microservices manager. The exposed actions may receive, as input, data or an identification of a data object or location of data that causes data to be moved into a data cloud.

The exposed actions may receive, as input, a request to increase or decrease existing alert thresholds. The input may identify existing in-application alert thresholds and whether to increase, decrease, or delete the threshold. The input may request the microservice application to create new in-application alert thresholds. The in-application alerts may trigger alerts to the user while logged into the application or may trigger alerts to the user, using default or user-selected alert mechanisms available within the microservice application itself, rather than through other applications plugged into the microservices manager.

The microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

12. Hardware Overview

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 9:
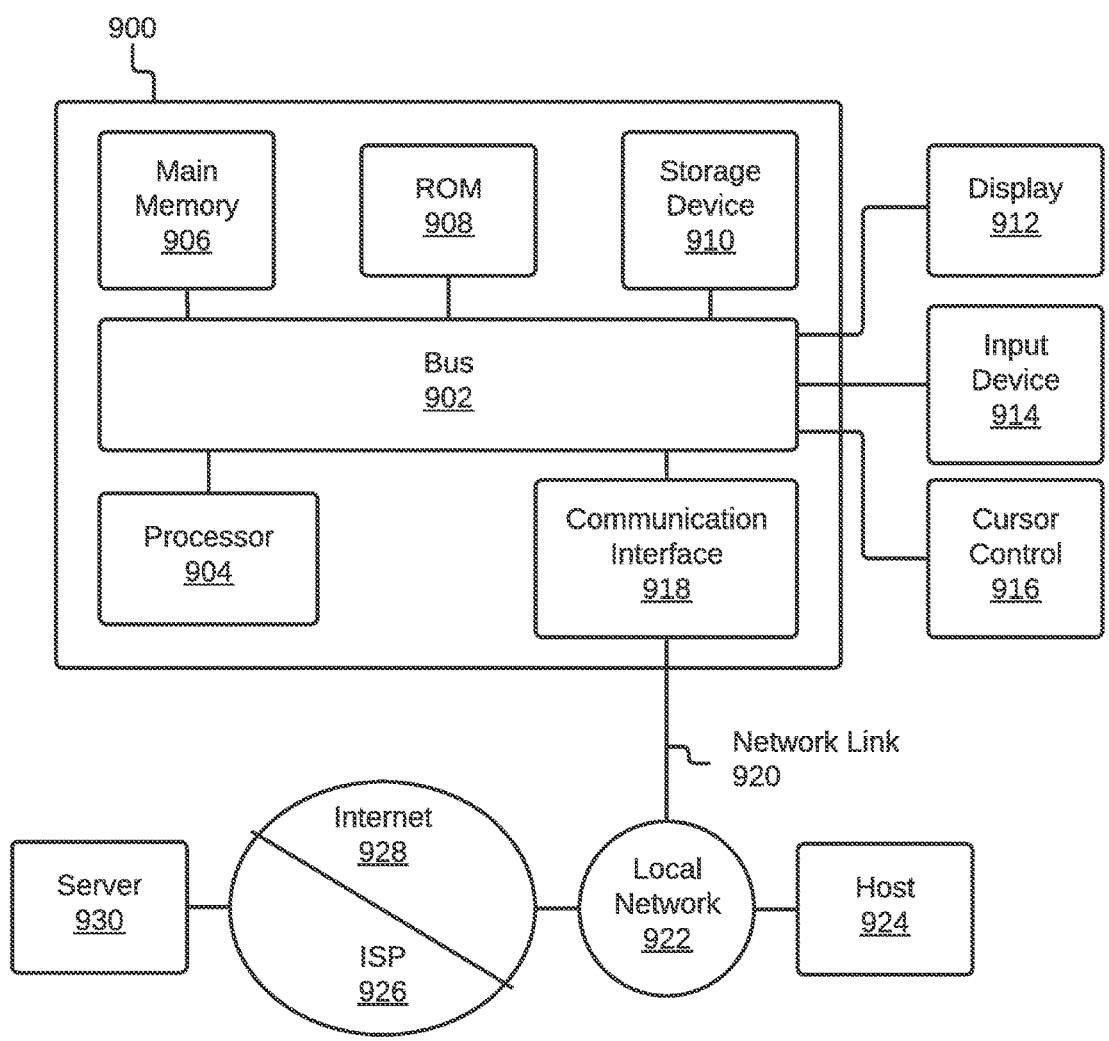
FIG. 9 shows a block diagram that illustrates a computer system in accordance with one or more embodiments.

For example, FIG. 9 is a block diagram that illustrates a computer system 900 upon which one or more embodiments of the invention may be implemented. The computer system 900 includes a bus 902 or other communication mechanism for communicating information, and a hardware processor 904 coupled with bus 902 for processing information. The hardware processor 904 may be, for example, a general-purpose microprocessor.

The computer system 900 also includes a main memory 906, such as a random access memory (RAM) or other dynamic storage device, coupled to bus 902 for storing information and instructions to be executed by processor 904. The main memory 906 also may be used for storing temporary variables or other intermediate information during execution of instructions to be executed by processor 904. Such instructions, when stored in non-transitory storage media accessible to the processor 904, render the computer system 900 into a special-purpose machine that is customized to perform the operations specified in the instructions.

The computer system 900 further includes a read only memory (ROM) 908 or other static storage device coupled to the bus 902 for storing static information and instructions for the processor 904. A storage device 910, such as a magnetic disk or optical disk, is provided and coupled to the bus 902 for storing information and instructions.

The computer system 900 may be coupled via the bus 902 to a display 912, such as a cathode ray tube (CRT), for displaying information to a computer user. An input device 914, including alphanumeric and other keys, is coupled to the bus 902 for communicating information and command selections to the processor 904. Another type of user input device is cursor control 916, such as a mouse, a trackball, or cursor direction keys for communicating direction information and command selections to the processor 904 and for controlling cursor movement on the display 912. This input device typically has two degrees of freedom in two axes, a first axis (e.g., x) and a second axis (e.g., y), that allows the device to specify positions in a plane.

The computer system 900 may implement techniques described herein using customized hard-wired logic, one or more ASICs or FPGAs, firmware, and/or program logic which in combination with the computer system 900 causes or programs the computer system 900 to be a special-purpose machine. In one or more embodiments, the techniques herein are performed by the computer system 900 in response to the processor 904 executing one or more sequences of one or more instructions contained in the main memory 906. Such instructions may be read into the main memory 906 from another storage medium, such as the storage device 910. Execution of the sequences of instructions contained in the main memory 906 causes the processor 904 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 910. Volatile media includes dynamic memory, such as the main memory 906. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 902. Transmission media can also take the form of acoustic or light waves, such as those generated during radio frequency (RF) and infrared data communications.

Various forms of media may be involved in carrying one or more sequences of one or more instructions to the processor 904 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 900 can receive the data on the telephone line or other communications medium and use an infrared transmitter to convert the data to an infrared signal. An infrared detector can receive the data carried in the infrared signal and appropriate circuitry can place the data on the bus 902. The bus 902 carries the data to the main memory 906, from which the processor 904 retrieves and executes the instructions. The instructions received by the main memory 906 may optionally be stored on the storage device 910, either before or after execution by processor 904.

The computer system 900 also includes a communication interface 918 coupled to the bus 902. The communication interface 918 provides a two-way data communication coupling to a network link 920 that is connected to a local network 922. For example, the communication interface 918 may be an integrated services digital network (ISDN) card, cable modem, satellite modem, or a modem to provide a data communication connection to a corresponding type of telephone line. As another example, the communication interface 918 may be a local area network (LAN) card configured to provide a data communication connection to a compatible LAN. Wireless links may also be implemented. In any such implementation, the communication interface 918 sends and receives electrical, electromagnetic, or optical signals that carry digital data streams representing various types of information.

The network link 920 typically provides data communication through one or more networks to other data devices. For example, the network link 920 may provide a connection through a local network 922 to a host computer 924 or to data equipment operated by an Internet Service Provider (ISP) 926. The ISP 926 in turn provides data communication services through the world wide packet data communication network now commonly referred to as the "Internet" 928. The local network 922 and Internet 928 both use electrical, electromagnetic, or optical signals that carry digital data streams. The signals through the various networks and the signals on the network link 920 and through the communication interface 918, which carry the digital data to and from the computer system 900, are example forms of transmission media.

The computer system 900 can send messages and receive data, including program code, through the network(s), network link 920, and communication interface 918. In the Internet example, a server 930 might transmit a requested code for an application program through the Internet 928, ISP 926, local network 922, and communication interface 918.

The received code may be executed by processor 904 as it is received, and/or may be stored in the storage device 910 or other non-volatile storage for later execution.

13. Miscellaneous; Extensions

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause performance of operations comprising:
   receiving, by a multi-tenant machine learning platform, a first set of untrusted code supplied by a first tenant of the multi-tenant machine learning platform;
   performing a first security scan, by the multi-tenant machine learning platform, of the first set of untrusted code to determine whether the first set of untrusted code satisfies a set of one or more security requirements of the multi-tenant machine learning platform;
   responsive to determining that the first set of untrusted code satisfies the set of one or more security requirements of the multi-tenant machine learning platform: deploying, by the multi-tenant machine learning platform, the first set of untrusted code to a first runtime execution environment of the multi-tenant machine learning platform;
   deploying, by the multi-tenant machine learning platform, a first machine learning model associated with the first tenant to the first runtime execution environment, the first set of untrusted code being configured to perform one or more functions using the first machine learning model;
   receiving, by the multi-tenant machine learning platform, a second set of untrusted code supplied by a second tenant of the multi-tenant machine learning platform;
   performing a second security scan, by the multi-tenant machine learning platform, of the second set of untrusted code to determine whether the second set of untrusted code satisfies the set of one or more security requirements of the multi-tenant machine learning platform;
   responsive to determining that the second set of untrusted code does not satisfy the set of one or more security requirements of the multi-tenant machine learning platform: refraining from deploying the second set of untrusted code to a second runtime execution environment of the multi-tenant machine learning platform.

2. The one or more non-transitory machine-readable media of claim 1, the operations further comprising:

receiving, by the multi-tenant machine learning platform, the first machine learning model from the first tenant.

3. The one or more non-transitory machine-readable media of claim 2, the operations further comprising:
performing an anti-virus scan of the first machine learning model to determine whether the first machine learning model is infected by any virus detectable by the anti-virus scan,
wherein deploying the first machine learning model associated with the first tenant to the first runtime execution environment is performed responsive to the first machine learning model passing the anti-virus scan.

4. The one or more non-transitory machine-readable media of claim 1, the operations further comprising:
receiving, by the multi-tenant machine learning platform, a third set of untrusted code supplied by a third tenant of the multi-tenant machine learning platform;
performing a third security scan, by the multi-tenant machine learning platform, of the third set of untrusted code to determine whether the third set of untrusted code satisfies the set of one or more security requirements of the multi-tenant machine learning platform;
responsive to determining that the third set of untrusted code satisfies the set of one or more security requirements of the multi-tenant machine learning platform:
storing, by the multi-tenant machine learning platform, the third set of untrusted code in a third runtime execution environment of the multi-tenant machine learning platform;
deploying, by the multi-tenant machine learning platform, a second machine learning model associated with the third tenant to the third runtime execution environment, the third set of untrusted code being configured to perform one or more functions using the second machine learning model.

5. The one or more non-transitory machine-readable media of claim 4, wherein the third runtime execution environment is uniquely associated with the third tenant and inaccessible to other tenants of the multi-tenant machine learning platform.

6. The one or more non-transitory machine-readable media of claim 1, wherein performing the first security scan comprises one or more of (a) determining whether one or more software components in the first set of untrusted code is up-to-date or (b) performing a virus scan of the first set of untrusted code.

7. The one or more non-transitory machine-readable media of claim 1, wherein receiving the first set of untrusted code comprises receiving a container image comprising the first set of untrusted code.

8. The one or more non-transitory machine-readable media of claim 1, wherein the first runtime execution environment of the multi-tenant machine learning platform executes in a cluster that is uniquely associated with the first tenant and deployed to a physical machine that is uniquely designated for the first tenant.

9. The one or more non-transitory machine-readable media of claim 1, wherein the first runtime executable environment is uniquely associated with the first tenant and inaccessible to other tenants of the multi-tenant machine learning platform.

10. The one or more non-transitory machine-readable media of claim 1, wherein the first set of untrusted code is configured to perform one or more of:
data scoring, at least by applying the first machine learning model to a data set;
generating predictions, at least by applying the first machine learning model to the data set; or
implementing a feedback loop that uses outputs of the first machine learning model to train the first machine learning model on an ongoing basis.

11. The one or more non-transitory machine-readable media of claim 1, wherein deploying the first machine learning model associated with the first tenant to the first runtime execution environment is performed responsive to determining that the first set of untrusted code satisfies the set of one or more security requirements of the multi-tenant machine learning platform.

12. The one or more non-transitory machine-readable media of claim 1, the operations further comprising:
bundling the first set of untrusted code and the first machine learning model before deploying the first set of untrusted code and the first machine learning model to the first runtime execution environment.

13. A system comprising:
at least one device comprising one or more hardware processors,
the system being configured to perform operations comprising:
receiving, by a multi-tenant machine learning platform, a first set of untrusted code supplied by a first tenant of the multi-tenant machine learning platform;
performing a first security scan, by the multi-tenant machine learning platform, of the first set of untrusted code to determine whether the first set of untrusted code satisfies a set of one or more security requirements of the multi-tenant machine learning platform;
responsive to determining that the first set of untrusted code satisfies the set of one or more security requirements of the multi-tenant machine learning platform:
deploying, by the multi-tenant machine learning platform, the first set of untrusted code to a first runtime execution environment of the multi-tenant machine learning platform;
deploying, by the multi-tenant machine learning platform, a first machine learning model associated with the first tenant to the first runtime execution environment, the first set of untrusted code being configured to perform one or more functions using the first machine learning model;
receiving, by the multi-tenant machine learning platform, a second set of untrusted code supplied by a second tenant of the multi-tenant machine learning platform;
performing a second security scan, by the multi-tenant machine learning platform, of the second set of untrusted code to determine whether the second set of untrusted code satisfies the set of one or more security requirements of the multi-tenant machine learning platform;
responsive to determining that the second set of untrusted code does not satisfy the set of one or more security requirements of the multi-tenant machine learning platform: refraining from deploying the second set of untrusted code to a second runtime execution environment of the multi-tenant machine learning platform.

14. The system of claim 13, the operations further comprising:
receiving, by the multi-tenant machine learning platform, the first machine learning model from the first tenant.

15. The system of claim 14, the operations further comprising:

performing an anti-virus scan of the first machine learning model to determine whether the first machine learning model is infected by any virus detectable by the anti-virus scan, wherein deploying the first machine learning model associated with the first tenant to the first runtime execution environment is performed responsive to the first machine learning model passing the anti-virus scan.

16. The system of claim 13, the operations further comprising:

receiving, by the multi-tenant machine learning platform, a third set of untrusted code supplied by a third tenant of the multi-tenant machine learning platform;

performing a third security scan, by the multi-tenant machine learning platform, of the third set of untrusted code to determine whether the third set of untrusted code satisfies the set of one or more security requirements of the multi-tenant machine learning platform;

responsive to determining that the third set of untrusted code satisfies the set of one or more security requirements of the multi-tenant machine learning platform: storing, by the multi-tenant machine learning platform, the third set of untrusted code in a third runtime execution environment of the multi-tenant machine learning platform;

deploying, by the multi-tenant machine learning platform, a second machine learning model associated with the third tenant to the third runtime execution environment, the third set of untrusted code being configured to perform one or more functions using the second machine learning model.

17. A method comprising:

receiving, by a multi-tenant machine learning platform, a first set of untrusted code supplied by a first tenant of the multi-tenant machine learning platform;

performing a first security scan, by the multi-tenant machine learning platform, of the first set of untrusted code to determine whether the first set of untrusted code satisfies a set of one or more security requirements of the multi-tenant machine learning platform;

responsive to determining that the first set of untrusted code satisfies the set of one or more security requirements of the multi-tenant machine learning platform: deploying, by the multi-tenant machine learning platform, the first set of untrusted code to a first runtime execution environment of the multi-tenant machine learning platform;

deploying, by the multi-tenant machine learning platform, a first machine learning model associated with the first tenant to the first runtime execution environment, the first set of untrusted code being configured to perform one or more functions using the first machine learning model;

receiving, by the multi-tenant machine learning platform, a second set of untrusted code supplied by a second tenant of the multi-tenant machine learning platform;

performing a second security scan, by the multi-tenant machine learning platform, of the second set of untrusted code to determine whether the second set of untrusted code satisfies the set of one or more security requirements of the multi-tenant machine learning platform;

responsive to determining that the second set of untrusted code does not satisfy the set of one or more security requirements of the multi-tenant machine learning platform: refraining from deploying the second set of untrusted code to a second runtime execution environment of the multi-tenant machine learning platform, wherein the method is performed by at least device comprising one or more hardware processors.

18. The method of claim 17, further comprising:

receiving, by the multi-tenant machine learning platform, the first machine learning model from the first tenant.

19. The method of claim 18, further comprising:

performing an anti-virus scan of the first machine learning model to determine whether the first machine learning model is infected by any virus detectable by the anti-virus scan, wherein deploying the first machine learning model associated with the first tenant to the first runtime execution environment is performed responsive to the first machine learning model passing the anti-virus scan.

20. The method of claim 17, further comprising:

receiving, by the multi-tenant machine learning platform, a third set of untrusted code supplied by a third tenant of the multi-tenant machine learning platform;

performing a third security scan, by the multi-tenant machine learning platform, of the third set of untrusted code to determine whether the third set of untrusted code satisfies the set of one or more security requirements of the multi-tenant machine learning platform;

responsive to determining that the third set of untrusted code satisfies the set of one or more security requirements of the multi-tenant machine learning platform: storing, by the multi-tenant machine learning platform, the third set of untrusted code in a third runtime execution environment of the multi-tenant machine learning platform;

deploying, by the multi-tenant machine learning platform, a second machine learning model associated with the third tenant to the third runtime execution environment, the third set of untrusted code being configured to perform one or more functions using the second machine learning model.

* * * * *

UNITED STATES PATENT AND TRADEMARK OFFICE
CERTIFICATE OF CORRECTION

| | | |
|---|---|---|
| PATENT NO. | : 12,124,564 B2 | Page 1 of 1 |
| APPLICATION NO. | : 17/870403 | |
| DATED | : October 22, 2024 | |
| INVENTOR(S) | : Venkataraman et al. | |

It is certified that error appears in the above-identified patent and that said Letters Patent is hereby corrected as shown below:

In the Specification

In Column 1, Line 8, delete "63,330,645," and insert -- 63/330,645, --, therefor.

In Column 1, Line 13, delete "application(s)" and insert -- application(s). --, therefor.

In Column 4, Line 14, delete "FIG." and insert -- FIGS. --, therefor.

Signed and Sealed this
Fourth Day of February, 2025

Coke Morgan Stewart
*Acting Director of the United States Patent and Trademark Office*